US007127558B2

(12) United States Patent
Honda et al.

(10) Patent No.: US 7,127,558 B2
(45) Date of Patent: Oct. 24, 2006

(54) VIRTUALIZATION CONTROLLER, ACCESS PATH CONTROL METHOD AND COMPUTER SYSTEM

(75) Inventors: Kiyoshi Honda, Yokohama (JP); Norio Shimozono, Machida (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 10/749,411

(22) Filed: Jan. 2, 2004

(65) Prior Publication Data

US 2005/0050271 A1    Mar. 3, 2005

(30) Foreign Application Priority Data

Sep. 2, 2003    (JP)    ............................. 2003-310250

(51) Int. Cl.
*G06F 12/08*    (2006.01)
(52) U.S. Cl. ...................... 711/114; 707/200; 711/158; 370/389
(58) Field of Classification Search ..................... None
See application file for complete search history.

(56) References Cited

U.S. PATENT DOCUMENTS

| 6,654,769 | B1* | 11/2003 | Ito et al. ..................... 707/200 |
| 6,785,750 | B1* | 8/2004 | Odenwald ..................... 710/38 |
| 6,898,670 | B1* | 5/2005 | Nahum ........................ 711/114 |
| 6,976,134 | B1* | 12/2005 | Lolayekar et al. .......... 711/148 |
| 2003/0005119 | A1* | 1/2003 | Mercier et al. ............. 709/225 |
| 2003/0188114 | A1 | 10/2003 | Lubbers et al. |
| 2003/0210686 | A1* | 11/2003 | Terrell et al. ............... 370/389 |
| 2004/0034751 | A1* | 2/2004 | Horn et al. ................. 711/158 |
| 2004/0103261 | A1 | 5/2004 | Honda et al. |
| 2004/0260861 | A1 | 12/2004 | Serizawa et al. |
| 2005/0005062 | A1 | 1/2005 | Liu et al. |
| 2005/0232285 | A1* | 10/2005 | Terell et al. ................ 370/401 |

FOREIGN PATENT DOCUMENTS

| JP | 3127157 | 5/1991 |
| JP | 5-12077 | 1/1993 |

* cited by examiner

*Primary Examiner*—Mano Padmanabhan
*Assistant Examiner*—Kaushik Patel
(74) *Attorney, Agent, or Firm*—Mattingly, Stanger, Malur & Brundidge, P.C.

(57) ABSTRACT

According to the present invention, it is possible to enhance a performance in accessing a storage system, without performing data migration process between the storages constituting the storage system. A virtualization controller 2 connecting a host computer 1 and a storage 3 constituting the storage system controls a plurality of access paths (path such as port 6-backplane 9-port 6, port 6-backplane 9-storage controller 7-port 6) provided within the virtualization controller. It further performs a control so that an optimum access path is selected for switching, out of the plurality of access paths, based on setting information from a management server 4 by a system administrator and various monitoring results detected by the virtualization controller itself.

13 Claims, 15 Drawing Sheets

FIG. 5

| VIRTUAL VOLUME MANAGEMENT INFORMATION (531) | | | REAL VOLUME MANAGEMENT INFORMATION (532) | | | VIRTUALIZATION PROCESSING MODULE MANAGEMENT INFORMATION (533) | STORAGE CONNECTION MODULE MANAGEMENT INFORMATION (534) | COMMAND PROCESSING MODE (535) |
|---|---|---|---|---|---|---|---|---|
| PORT ID | PORT NAME | LUN | PORT ID | PORT NAME | LUN | | | |
| V_PID_1 | V_PNAME_1 | 0 | V_PID_1 | V_PNAME_1 | 0 | STORAGE CONTROLLER #1 | OUT PORT | NORMAL |
| V_PID_2 | V_PNAME_2 | 0 | V_PID_1 | V_PNAME_1 | 1 | STORAGE CONTROLLER #1 | OUT PORT | NORMAL |
| V_PID_3 | V_PNAME_3 | 0 | V_PID_1 | V_PNAME_1 | 2 | OUT PORT | OUT PORT | NORMAL |
| V_PID_4 | V_PNAME_4 | 0 | V_PID_1 | V_PNAME_1 | 3 | OUT PORT | OUT PORT | NORMAL |
| ⋮ | ⋮ | ⋮ | ⋮ | ⋮ | ⋮ | ⋮ | ⋮ | ⋮ |

FIG. 6

| SENDING SOURCE MANAGEMENT INFORMATION (541) | | SENDING DESTINATION MANAGEMENT INFORMATION (542) | |
|---|---|---|---|
| SENDING SOURCE IDENTIFICATION INFORMATION | SENDING SOURCE COMMAND IDENTIFICATION INFORMATION | DESTINATION IDENTIFICATION INFORMATION | COMMAND IDENTIFICATION INFORMATION |
| HOST_PID_1 | HOST_TAG_1 | STORAGE CONTROLLER #1 | INPORT_TAG_1 |
| HOST_PID_1 | HOST_TAG_2 | STORAGE CONTROLLER #1 | INPORT_TAG_2 |
| HOST_PID_1 | HOST_TAG_3 | OUT PORT | INPORT_TAG_3 |
| HOST_PID_1 | HOST_TAG_4 | OUT PORT | INPORT_TAG_4 |
| ⋮ | ⋮ | ⋮ | ⋮ |

FIG.12

| ACCESS TYPE | | WEIGHED FACTOR |
|---|---|---|
| READ TYPE ACCESS | PROXIMAL ACCESS | 2 |
| | IDENTICAL ADDRESS ACCESS | 1 |
| | CONTINUOUS ADDRESS ACCESS | -1 |
| | OTHER ACCESS (THE FIRST ACCESS) | 0 |
| WRITE TYPE ACCESS | ROXIMAL ACCESS | 0 |
| | IDENTICAL ADDRESS ACCESS | 1 |
| | CONTINUOUS ADDRESS ACCESS | -2 |
| | OTHER ACCESS (THE FIRST ACCESS) | 0 |

FIG.13

| ACCESS TYPE | | LUN 0 | LUN 1 | LUN 2 | LUN 3 |
|---|---|---|---|---|---|
| READ TYPE ACCESS | PROXIMAL ACCESS | 100 | 50 | 10 | 0 |
| | IDENTICAL ADDRESS ACCESS | 100 | 50 | 10 | 0 |
| | CONTINUOUS ADDRESS ACCESS | 0 | 10 | 100 | 0 |
| | OTHER ACCESS | 10 | 10 | 10 | 10 |
| WRITE TYPE ACCESS | ROXIMAL ACCESS | 10 | 50 | 0 | 0 |
| | IDENTICAL ADDRESS ACCESS | 10 | 50 | 0 | 0 |
| | CONTINUOUS ADDRESS ACCESS | 0 | 10 | 0 | 100 |
| | OTHER ACCESS | 10 | 10 | 0 | 10 |

FIG.14

| ACCESS TYPE | | LUN 0 | LUN 1 | LUN 2 | LUN 3 |
|---|---|---|---|---|---|
| READ TYPE ACCESS | PROXIMAL ACCESS | 10 | 50 | 10 | 0 |
| | IDENTICAL ADDRESS ACCESS | 10 | 50 | 10 | 0 |
| | CONTINUOUS ADDRESS ACCESS | 200 | 10 | 100 | 0 |
| | OTHER ACCESS | 10 | 10 | 10 | 10 |
| WRITE TYPE ACCESS | ROXIMAL ACCESS | 0 | 50 | 0 | 0 |
| | IDENTICAL ADDRESS ACCESS | 0 | 50 | 0 | 0 |
| | CONTINUOUS ADDRESS ACCESS | 0 | 10 | 0 | 100 |
| | OTHER ACCESS | 10 | 10 | 0 | 10 |

FIG.17

| VIRTUAL VOLUME MANAGEMENT INFORMATION 531 | | | | REAL VOLUME MANAGEMENT INFORMATION 532 | | | VIRTUALIZATION PROCESSING MODULE MANAGEMENT INFORMATION 533 | STORAGE CONNECTION MODULE MANAGEMENT INFORMATION 534 | COMMAND PROCESSING MODE 535 |
|---|---|---|---|---|---|---|---|---|---|
| PORT ID | PORT NAME | LUN | ADDRESS | PORT ID | PORT NAME | LUN | | | |
| V_PID_1 | V_PNAME_1 | 0 | 0h~98967Fh | P_PID_1 | P_PNAME_1 | 0 | STORAGE CONTROLLER #1 | OUT PORT | NORMAL |
| | | | 989680h~1312CFFh | | | 4 | | | |
| V_PID_2 | V_PNAME_2 | 0 | 0h~1312CFFh | P_PID_1 | P_PNAME_1 | 1 | STORAGE CONTROLLER #1 | OUT PORT | NORMAL |
| V_PID_3 | V_PNAME_3 | 0 | 0h~1312CFFh | P_PID_1 | P_PNAME_1 | 2 | OUT PORT | OUT PORT | NORMAL |
| V_PID_4 | V_PNAME_4 | 0 | 0h~1312CFFh | P_PID_1 | P_PNAME_1 | 3 | OUT PORT | OUT PORT | NORMAL |
| ⋮ | ⋮ | ⋮ | ⋮ | ⋮ | ⋮ | ⋮ | ⋮ | ⋮ | ⋮ |

FIG.18

| VIRTUAL VOLUME MANAGEMENT INFORMATION 531 | | | | REAL VOLUME MANAGEMENT INFORMATION 532 | | | VIRTUALIZATION PROCESSING MODULE MANAGEMENT INFORMATION 533 | STORAGE CONNECTION MODULE MANAGEMENT INFORMATION 534 | COMMAND PROCESSING MODE 535 |
|---|---|---|---|---|---|---|---|---|---|
| PORT ID | PORT NAME | LUN | ADDRESS | PORT ID | PORT NAME | LUN | | | |
| V_PID_1 | V_PNAME_1 | 0 | 0h~98967Fh | P_PID_1 | P_PNAME_1 | 0 | STORAGE CONTROLLER #1 | OUT PORT | NORMAL |
| | | | 989680h~1312CFFh | | | 4 | | | |
| V_PID_2 | V_PNAME_2 | 0 | 0h~1312CFFh | P_PID_1 | P_PNAME_1 | 1 | STORAGE CONTROLLER #1 | OUT PORT | NORMAL |
| V_PID_3 | V_PNAME_3 | 0 | 0h~1312CFFh | P_PID_1 | P_PNAME_1 | 2 | OUT PORT | OUT PORT | NORMAL |
| V_PID_1 | V_PNAME_1 | 3 | 0h~1312CFFh | P_PID_1 | P_PNAME_1 | 3 | OUT PORT | OUT PORT | NORMAL |
| ⋮ | ⋮ | ⋮ | ⋮ | ⋮ | ⋮ | ⋮ | ⋮ | ⋮ | ⋮ |

VIRTUALIZATION CONTROLLER, ACCESS PATH CONTROL METHOD AND COMPUTER SYSTEM

BACKGROUND OF THE INVENTION

The present invention relates to a virtualization controller, an access path control method, and a computer system. More particularly, it relates to a virtualization controller which connects a host computer and a plurality of storages by a path and provides the host computer with the plurality of storages as virtual N units of storages, an access path control method of the virtualization controller, and a computer system.

As a conventional art that has achieved an enhancement of performance for accessing to a storage system, for example, a technique described in Japanese Patent Application Laid-Open Publication No. Hei 5-12077 is known which will be referred to as "Patent Document 1" hereinafter. This conventional art discloses that a storage system comprises a plurality of storages each has different accessing speed, and according to an accessing frequency to each of the plurality of storages, relocation is automatically carried out between a high-speed accessible storage and a low-speed accessible storage.

The above described conventional art comprises a storage medium which stores data, and a controller which carries out an overall control (for example, data transfer control between a host computer and a storage medium) utilizing the storage medium as a storage, and it is configured such that the host computer and the storage medium are connected via one access path. However, in the foregoing conventional art, there is no consideration regarding a selection of optimum access path, out of the plurality of access paths provided in the controller. Therefore, there is a problem that it is difficult to achieve a performance enhancement in accessing the storage. That is, in the foregoing conventional art, when a plurality of access paths are provided by the controller as access path between the host computer and the storage, for example, there is not disclosed a technique regarding the access performance enhancement by optimizing the access path, considering a usage rate of various resources existing on the access path.

Further, according to the foregoing conventional art, a performance enhancement has been achieved in accessing the storage system which is configured with a plurality of storages each having different access speed, by carrying out optimization (optimal allocation of stored data) of the storage which stores data, according to access frequency to each of the plurality of storages in the storage system. However, in this conventional art, a dada migration (relocation) process between the storages is necessary so as to enhance the access performance of the storage system, and during this data migration process, an access request from the host computer is suspended temporarily in the storage or the access request is processed simultaneously with the data migration process. Therefore, there is a problem that the access performance is remarkably deteriorated.

SUMMARY OF THE INVENTION

A feature of the present invention is to solve the problems of the conventional art as described above, and to provide a virtualization controller, an access path control method of the virtualization controller, and a computer system, where the virtualization controller is capable of selecting an optimal access path and performs switching thereto, out of a plurality of access paths which connect between a host computer and a storage, without carrying out a data migration process between the storages constituting a storage system, then enhancing an access performance to the storage system.

Another feature of the present invention is to provide a virtualization controller, an access path control method of the virtualization controller, and a computer system, where the virtualization controller carries out the aforementioned access path switching process based on a usage status of various resources constituting the virtualization controller, allowing a distribution control of processing load within the virtualization controller, and consequently, achieving an enhancement of the access performance to the storage system.

Another feature of the present invention is to provide a virtualization controller, an access path control method of the virtualization controller and a computer system, where the virtualization controller carries out the aforementioned access path switching process, based on a setup condition from a system administrator and various results (usage status of the resource, access trend, and the like) which are detected by the virtualization controller itself, so as to be prepared for the access performance required for the storage system which dynamically changes, without increasing the load on the system administrator.

In order to achieve the above features, the present invention is characterized in that a virtualization controller located between a host computer and a storage provides a plurality of access paths to connect the host computer and the storage, and carries out a process which selects an optimal access path and performs switching thereto out of the plurality of access paths which connect the host computer and the storage, based on a setup condition from a system administrator regarding the switching process of the access path and various monitoring results and the like (resources usage status, access trend, and others) detected by the virtualization controller itself.

More specifically, the above features are achieved by a virtualization controller which is connected to one or a plurality of storages and one or a plurality of host computers, comprising a plurality of ports connected to one or both of the host computer and the storage, and one or a plurality of storage controllers, wherein, each of the ports and the storage controllers comprises a virtualization processor which holds corresponding information between first identification information and second identification information, the first identification information being used for the host computer to access the storage area held by the storage, and the second identification being used for the virtualization controller to identify the storage area, converts based on the corresponding information the data having the first identification information received from the host computer into data having the second identification information, and transfers the converted data to a storage having the storage area, converts the data having the second identification information received from the storage into data having the first identification information, and transfers the converted data to the host computer, the virtualization processor further including, access path management information which registers a first port controlled by the host computer, a second port connected to the storage, and the virtualization processor, as an access path for each storage area of the storage, and when a request for changing the access path is received, the access path management information is updated, and data send/receive control is carried out between the host computer and the storage area of the storage by use of a new access path.

The above features are achieved by an access path control method in the virtualization controller which executes a conversion process as to the identification information of the data sent/received between the host computer and the storage, and executes a further conversion process as to the identification information allocated to the storage area, and then carries out switching of the access paths, comprising, a step which detects a start-up timing of a switching process of the virtualization processor allocated with respect to each storage area held by the storage, a step which monitors a processing status of an access request issued to the storage area which is a target for the switching process of the virtualization processor, a step which temporarily queues the access request to the storage area which is a target for the switching process newly received from the host computer, when incomplete access request exists, a step which issues an instruction to change the virtualization processor to each of the modules which constitute the virtualization controller and relate to the switching process of the virtualization processor, when the incomplete access request does not exist, and a step which issues the access request thus queued to a new virtualization processor, at a timing when a completion report as to the instruction for changing the virtualization processor is received.

The above features are achieved by a computer system in which one or a plurality of storages, one or a plurality of host computers, and a virtualization controller are connected, wherein the virtualization controller comprising, a plurality of ports connected to one or both of the host computer and the storage, and one or a plurality of storage controllers, wherein, each of the ports and the storage controllers comprises a virtualization processor which holds corresponding information between first identification information and second identification information, the first identification information being used for the host computer to access the storage area held by the storage, and the second identification being used for the virtualization controller to identify the storage area, converts based on the corresponding information the data having the first identification information received from the host computer into data having the second identification information, and transfers the converted data to a storage having the storage area, converts the data having the second identification information received from the storage into data having the first identification information, and transfers the converted data to the host computer, further the virtualization controller including as an access path for each storage area of the storage, access path management information which registers a first port connected to the host computer, a second port connected to the storage, and the virtualization processor, and when a request for changing the access path is received, the access path management information is updated, and data send/receive control is carried out between the host computer and the storage area of the storage by use of the new access path.

According to the present invention, it is possible to enhance an access performance to a storage system, and a distribution control of processing load within the virtualization controller can be achieved, and consequently the access performance to the device system can be enhanced. More particularly, according to the present invention, an access performance required for the storage system which dynamically changes, can be provided without increasing a load onto a system administrator.

BRIEF DESCRIPTION OF THE DRAWINGS

FIG. 5 is a diagram showing an example of volume mapping information managed in the virtualization controller.

FIG. 6 is a diagram showing an example of virtualization routing control information managed by every modules constituting the virtualization controller.

FIG. 12 is a table showing an example of access type, which is detected by an access trend detection processing program.

FIG. 13 is a diagram showing an example of access history management information managed in the port (In Port).

FIG. 14 is a diagram showing an example of the access history management information at an arbitrary point of time.

FIG. 17 is a diagram showing an example of volume mapping information managed by the virtualization controller when one virtual volume comprises two real volumes.

FIG. 18 is a diagram showing an example of the volume mapping information managed by the virtualization controller when one of the volumes in the storage is provided to a host computer without executing the virtualization process as to on the volume.

DESCRIPTION OF THE PREFERRED EMBODIMENTS

Hereinafter, preferred embodiments of a virtualization controller, an access path control method of the virtualization controller and a computer system of the present invention will be explained in detail, with reference to the attached drawings.

Figure 1:
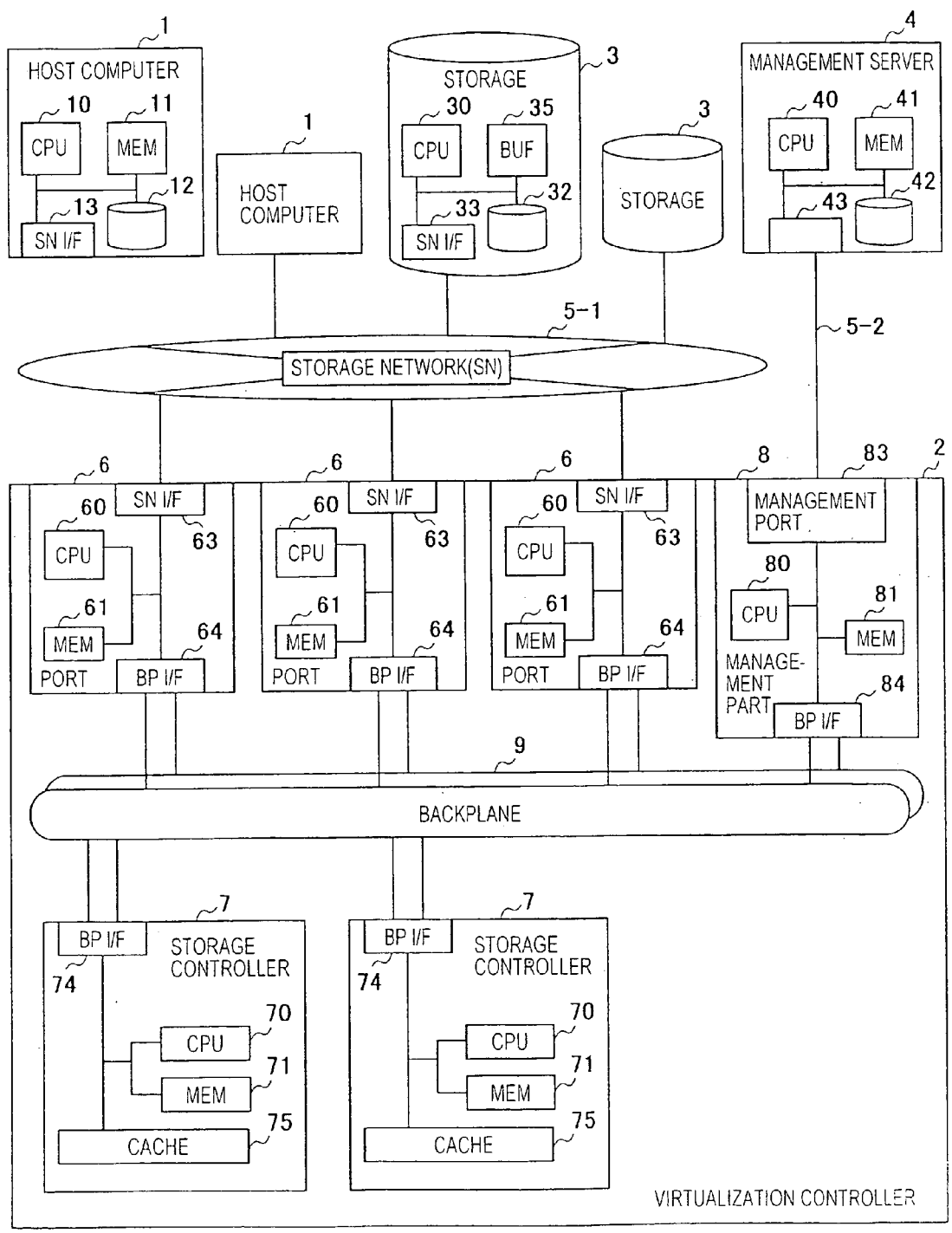
FIG. 1 is a block diagram showing a configuration of a computer system according to the first embodiment of the present invention.

FIG. 1 is a block diagram showing a configuration of a computer system according to the first embodiment of the present invention. The first embodiment of the present invention, which will be explained hereinafter, is an example of access path switching carried out by an instruction from a management server (system administrator). In FIG. 1, reference numeral 1 indicates a host computer, 2 indicates a virtualization controller, 3 indicates a storage, 4 indicates a management server, 5-1, 5-2 indicate networks, 6 indicates a port, 7 indicates a storage controller, 8 indicates a management part and 9 indicates a backplane.

The computer system according to the first embodiment of the present invention comprises one or a plurality of host computers 1, one or a plurality of storages 3, a virtualization controller 2 connected to the host computer 1 and the storage 3, a management server 4 connected to the virtualization controller 2. The host computer 1 and the storage 3 are connected to the virtualization controller 2 via the network (Storage Network: SN) 5-1, and the management server 4 is connected to the virtualization controller 2 via the network 5-2. Protocols used in the network 5-1 and the network 5-2 may be same or may be different from each other. Further, the protocol used in the network 5-1 may not be limited to an identical protocol. For example, the protocol used in the network between the storage 3 and the virtualization controller 2 may be different from the network protocol used in the network between the host computer 1 and the virtualization controller 2. More particularly, it is also possible to use network protocols different by storage and different by host computer to establish a connection with the virtualization controller 2.

The host computer 1, comprises a CPU 10 which executes an application program, a memory 11 which stores the application program, a recording medium 12 such as magnetic disk, an interface controller 13 (SN I/F) which controls the network 5-1 connected with the virtualization controller 2.

The management server 4 comprises a CPU 40 which executes a management program for managing the virtualization controller 2 and the storage 3 connected to the virtualization controller 2, a memory 41 which stores the management program, a recording medium 42 such as magnetic disk, an interface controller 43 which controls the network 5-2 connected with the virtualization controller 2.

The storage 3 comprises an interface controller 33 (SN I/F) which controls the network 5-1 connected with the virtualization controller 2, a recording medium 32 such as magnetic disk which stores user data, a CPU 30 which controls individual access to the recording medium 32 based on the access request from the host computer 1, and a buffer 35 which stores data transferred between the host computer 1 and the recording medium 32.

In the foregoing description, a group of disk devices comprising plural disk devices may be used as the recording medium 32 of the storage 3. In that case, it is desirable that the storage 3 is connected to the group of disk devices, provided with at least one disk interface controller which carries out data sending/receiving between individual disk device and the buffer 35.

The virtualization controller 2 serves as a switch which transfers frame data sent/received between the host computer 1 and the storage 3. The virtualization controller 2 is configured by connecting, via a backplane 9, one or a plurality of ports 6, one or a plurality of storage controllers 7, and a management part 8.

The port 6 comprises an interface controller (SN I/F) 63 which controls the network 5-1 connected either the host computer 1 or the storage 3, an interface controller (BP I/F) 64 which controls the backplane 9 establishing a connection between each of the modules constituting the virtualization controller 2, a memory 61 which stores a program and information items described below, and a CPU 60 which executes the program with the information items.

The storage controller 7 comprises an interface controller (BP I/F) 74 for controlling the backplane 9, a cache 75 which holds data transferred between the host computer 1 and the storage 3, a memory 71 which stores a program and information items as described below, and a CPU 70 which executes the program with the information items.

The management part 8 comprises an interface controller (Management Port) 83 which controls the network 5-2 connected with the management server 4, an interface controller (BP I/F) 84 which controls the backplane 9 connecting each of the modules constituting the virtualization controller 2, a memory 81 which stores a program and information items as described below, and a CPU 80 which executes the program with the information items.

In the example as shown in FIG. 1, each of the host computer 1, the storage 3, and the management server 4 includes one interface controller (SN I/F) However, the present invention is not limited to this configuration, and a plurality of interface controllers may be included. Similarly, each of the modules constituting the virtualization controller 2 may include a plurality of interface controllers (BP I/F) which control the backplane 9, and it is desirable that the interface controllers are respectively connected via a plurality of networks and backplanes. More particularly, since the port 6 of the virtualization controller 2 can handle a different network protocol, it is also possible to employ an arbitrary port 6 as the management part 8, by replacing the program and information items as described below.

Figure 2:
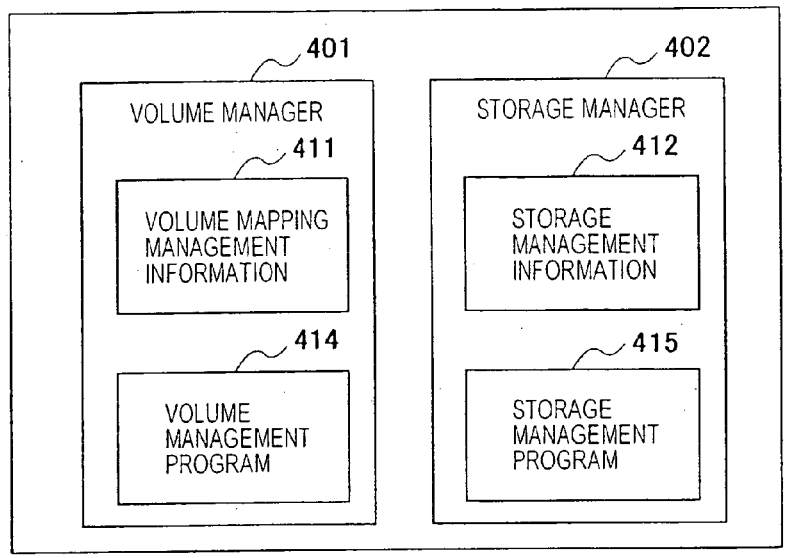
FIG. 2 is a diagram showing an example of programs and management information items stored in a recording medium of a management server.

FIG. 2 is a diagram showing an example of a program stored in the recording medium 42 of the management server 4, read in the memory 41 and then executed by the CPU 40, and management information items stored in the recording medium 42 of the management server 4.

In FIG. 2, the volume management program 414 is a program which reads volume mapping information 511 which will be described below from the virtualization controller 2, outputs the information to the output device, and notifies the system administrator of the volume mapping information. Further, the volume management program 414 receives from the system administrator via input device, an information item to be newly registered in the volume mapping information 511 and an update information item for the volume mapping information 511, and sends those information items to the virtualization controller 2. Then, the volume management program 414 is a program to execute a process for setting the information items received from the system administrator to the volume mapping information 511. The volume mapping management information 411 includes volume mapping information 511 read out from the virtualization controller 2, and registration information and update information received from the system administrator. Then, the CPU 40 of the management server 4 implements the volume manager 401 by executing the volume management program 414 by use of the volume mapping management information 411.

Here, a "volume" represents a storage area managed in individual storage (including virtualized storage), and it is possible for one storage to configure a plurality of volumes. Alternatively, it is also possible for a plurality of storages to configure one volume. The volume managed by the storage 3 is assumed to be a real volume, a volume managed by the virtualization controller 2 or a volume provided to the host computer 1 via the virtualization controller 2 is assumed to be a virtual volume. In the following explanation, those terms are used with such distinction therebetween.

A storage management program 415 is a program which reads storage status management information 517 as described below from the virtualization controller 2, outputs the information to the output device, and notifies the system administrator of the status of the storage. Further, the storage management program 415 is a program to execute receiving from the system administrator registration information or update information to the storage status management information 517 so as to set those information items to the virtualization controller 2. The storage management information 412 includes storage status management information 517 received from the virtualization controller 2, and registration information and update information received from the system administrator. Then, the CPU 40 of the management server 4 implements the storage manager 402 by executing the storage management program 415 by use of the storage management information 412.

Figure 3:
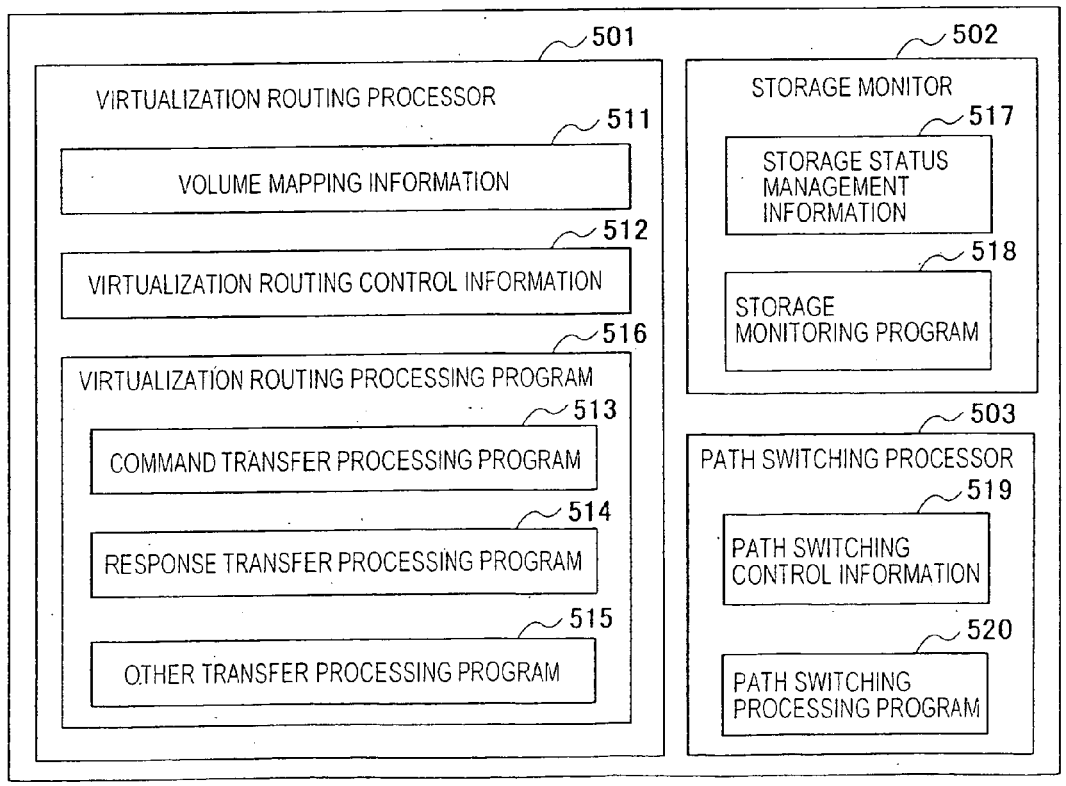
FIG. 3 is a diagram showing an example of programs and management information items executed in any of the modules constituting a virtualization controller.

FIG. 3 is a diagram showing an example of programs executed by the CPU and management information items in any of the modules (port 6, storage controller 7, and management part 8) which constitute the virtualization controller 2.

In FIG. 3, the virtualization routing processor 501 executes a routing process on the frame data sent and received between the host computer 1 and the storage 3, and the virtualization routing processor 501 is implemented when a CPU in any of the modules constituting the virtualization controller 2 executes a virtualization routing processing program 516, which is read into a memory of the module to which the above CPU belongs to, based on the volume mapping information 511 and the virtualization routing control information 512.

The frame data, here referred to, includes access request information (command) sent from the host computer 1 to the storage 3, status information (response) sent from the storage 3 to the host computer 1, and all of the other information items including data and the like sent and received between the host computer 1 and the storage 3 based on the access request information. It is assumed that the virtualization routing processing program 516 as described above comprises a command transfer processing program 513, a response transfer processing program 514, and other transfer processing program 515.

Details regarding the volume mapping information 511, virtualization routing control information 512 and a routing process of the frame data will be described below.

The storage monitor 502 monitors a status of individual storage 3, being a target of virtualization control by the virtualization controller 2, holds the monitored result as storage status management information 517, notifies the management server 4 of the status change at timing when a change of status of the storage 3 is detected. Further, the storage monitor 502 executes a processing for updating the storage status management information 517 held therein based on the storage management information 412 received from the management server 4. Then, the storage monitor 502 is implemented when the CPU in any of the modules constituting the virtualization controller 2 executes the storage monitoring program 518.

For example, a path switching processor stores as path switching control information 519, the information relating to the path switching control contained in the volume mapping management information 411 received from the management server 4. Based on the path switching control information 519, the path switching processor 503 executes a switching process of a transfer path (referred to as "access path" hereinafter) within the virtualization controller 2, of the frame data sent and received between the host computer 1 and the storage 3. The path switching processor 503 is implemented when the CPU in any of the modules constituting the virtualization controller 2 executes the path switching processing program 520. Details of the contents of processing, procedures and the like in the path switching processing program 520 will be described below.

In FIG. 3 as described above, descriptions of programs and the like concerning initialization process in the virtualization controller 2 are omitted. However, it is desirable to include an initialization processing program for executing an initialization process for various management information, at least on condition of power input, or a program group for executing the initialization process or a diagnostic process and the like upon receipt of an instruction from the management server 4 and so on.

Figure 4:
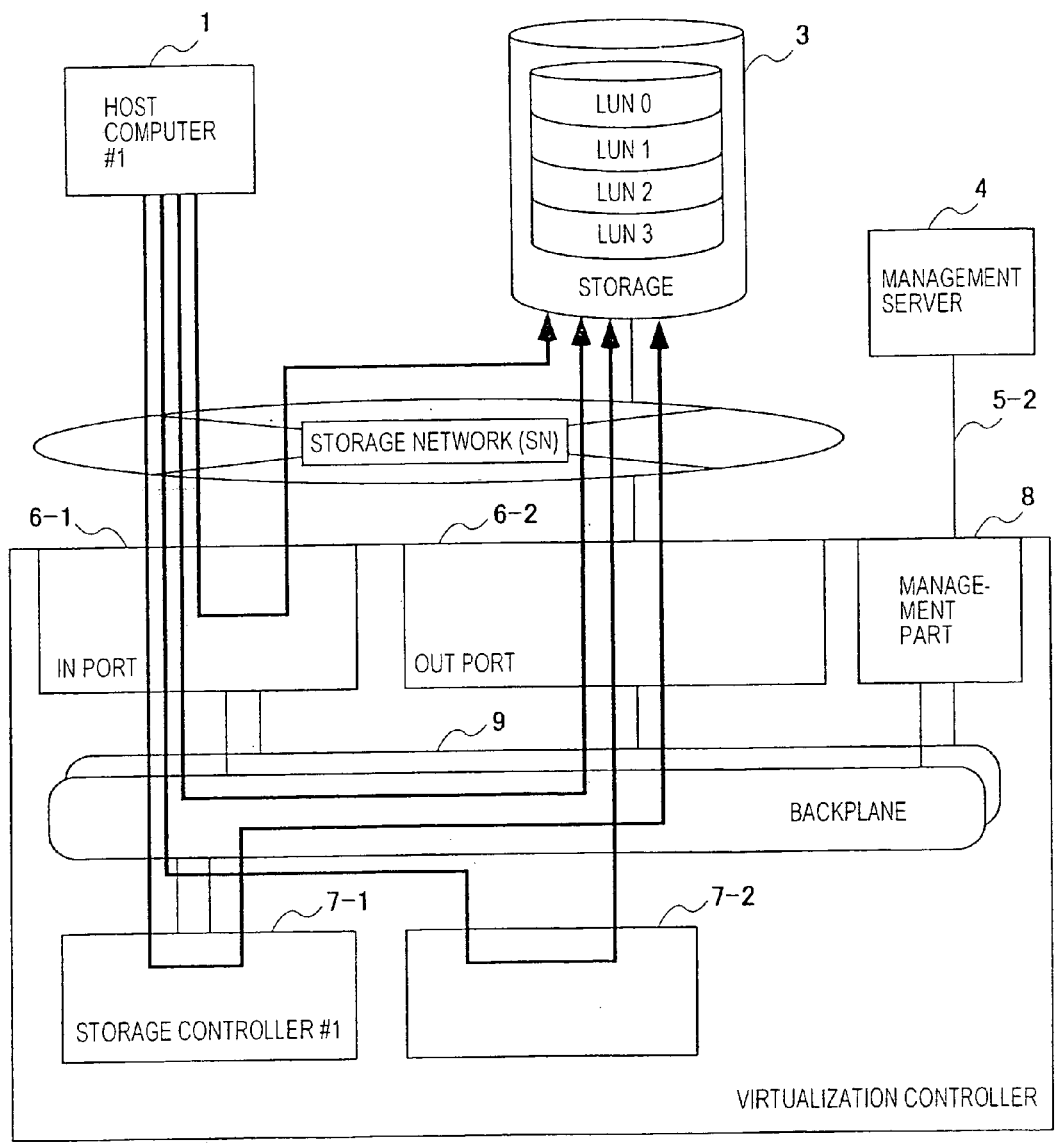
FIG. 4 is a diagram showing variations of access paths between a host computer and storage.

FIG. 4 is a diagram showing access path variations between the host computer 1 and the storage 3. In FIG. 4, the port 6-1 which is connected with the host computer 1 is referred to as "In Port", and the port 6-2 which is connected to the storage 3 is referred to as "Out Port".

The first access path is a path which establishes a connection between the host computer 1 and the storage 3, via the port 6-1 (In Port), the storage controller 7-1 (Storage Controller #1) and the port 6-2 (Out Port). Further, there is also a path which establishes a connection between the host computer 1 and the storage 3, via the port 6-1 (In Port), the storage controller 7-2 (Storage Controller #2), and the port 6-2 (Out Port).

The second access path is a path that connects the host computer 1 and the storage unit 3 via the ports 6-1 (In Port) and 6-2 (Out Port). As a variation of this path, there is another path for connecting the host computer 1 and the storage 3 via only one port in which a plurality of interface controllers (SN I/F) 63 are provided so that one port can serve as both In Port and Out Port.

FIG. 5 is a diagram showing an example of volume mapping information 511 which is managed by the virtualization controller 2.

The volume mapping information 511 is control information indicating a mapping as to a virtual volume and a real volume, and comprises virtual volume management information 531, real volume management information 532, virtualization processing module management information 533, storage connection module (a port) management information 534, and command processing mode information 535.

The virtual volume management information 531 is information to identify the virtual volume, and includes Port ID having a unique value in the network, Port Name having a unique value by port, LUN (Logical Unit Number) which is unique information in the device, and the like. The real volume management information 532 is information to identify a real volume corresponding to a virtual volume, and includes Port ID having a unique value in the network, Port Name having a unique value by port, LUN which is unique information having a unique value in the device, and the like. The virtualization processing module management information 533 is identifier information of a module which executes a virtualization process described below. The storage connection module (a port) management information 534 is identifier information of the port 6 intervening in the access path between the virtualization processing module and the storage 3. The command processing mode information 535 is information that is set at the time of path switching process as described below.

In the foregoing description, the Port ID and the Port Name, which are information items for identifying the virtual volume, are identifier information items allocated in the storage that is presented to the host computer 1 (referred to as "virtual storage" hereafter) by the virtualization controller 2. For example, when the host computer 1 transmits frame data designating a Port ID and LUN registered in the virtual volume management information 531, the virtualization routing processor 501 of the virtualization controller 2 controls so that the frame data is transmitted to the storage having the real volume corresponding to the virtual volume indicated by the aforementioned Port ID and LUN, based on the volume mapping information 511 and the virtualization routing control information 512, in reality. However, the host computer 1 recognizes that the access is made to the storage having the port indicated by the Port ID which the host computer has designated.

In the example as shown in FIG. 5, the virtual volumes identified by Port ID=V_Pid_1/2/3/4, Port Name=V_Pname_1/2/3/4, LUN=0 shows examples which are subjected to mapping to (associated with) the real volumes identified by Port ID=P_Pid_1, Port Name=P_Pname_1, LUN=0/1/2/3.

Further in FIG. 5, there is shown an example that identifier information of the storage controller 7 (Storage Controller #1) is set as a module for executing the virtualization process described below for the virtual volume identified by Port ID=V_Pid_1/2, LUN=0, and identifier information of the port 6 (Out Port) is set as a module for executing the virtualization process for the virtual volume identified by Port ID=V_Pid_3/4, LUN=0.

Further, FIG. 5 shows an example that a module for carrying out the virtualization process and the identifier information of the port 6 (Out Port) intervening in the access path with the storage 3 are respectively set, and "Normal (normal processing)" modes are respectively set as command processing mode information to the virtual volume.

In each module constituting the virtualization controller 2, it is not necessary to hold same volume mapping information 511, and it is desirable for each module to hold and manage the volume mapping information 511 comprising only the information that is necessary in each module.

In an embodiment of the present invention which will be explained below, an example will be described that the virtual volume can be identified by the Port ID. However, the present invention is not limited to this, and as far as the virtual volume can be identified with combination of each information item constituting the virtual volume management information 531, there is no problem. For example, it may also be possible to associate one Port ID with a plurality of virtual volumes.

FIG. 6 is a diagram showing an example of virtualization routing control information 512 which is managed by each of the modules constituting the virtualization controller 2.

The virtualization routing control information 512 is information which is generated, referred to and updated when each of the modules constituting the virtualization controller 2 executes a frame data transfer process as described below, and this information comprises sending source management information 541 and sending destination management information 542. The sending source management information 541 comprises the identification information of the sending source and command identification information designated by the sending source. The sending destination management information 542 comprises the identification information of the sending destination and the command identification information designated by the sending destination management information.

The command identification information as described above is information for identifying with which command individual frame data items are associated, the data items being sent and received between the sending source and sending destination. Further, the command identification information is to be added to the individual frame data items.

It is to be noted that detailed description of data structure of the aforementioned frame data is omitted. However, it is assumed that the frame data comprises at least information for identifying sending source/sending destination of the frame data (sending source/sending destination identification information), frame data type information, header information having the command identification information, the aforementioned access request information, and status information or payload information having data and the like.

In FIG. 6, an example of the virtualization routing control information 512 is shown, which is held and managed by the port 6-1 (In Port) connected to the aforementioned host computer 1. That is, commands identified by Host_Tag_1/2/3 are received from the host computer 1 which is identified by Hot_Pid_1, adds the command identification information InPort_Tag_1/2/3 respectively designated by the port 6, and transfers the information to the storage controller 7 (Storage Controller #1) or the port 6-2 (Out Port).

Figure 7:
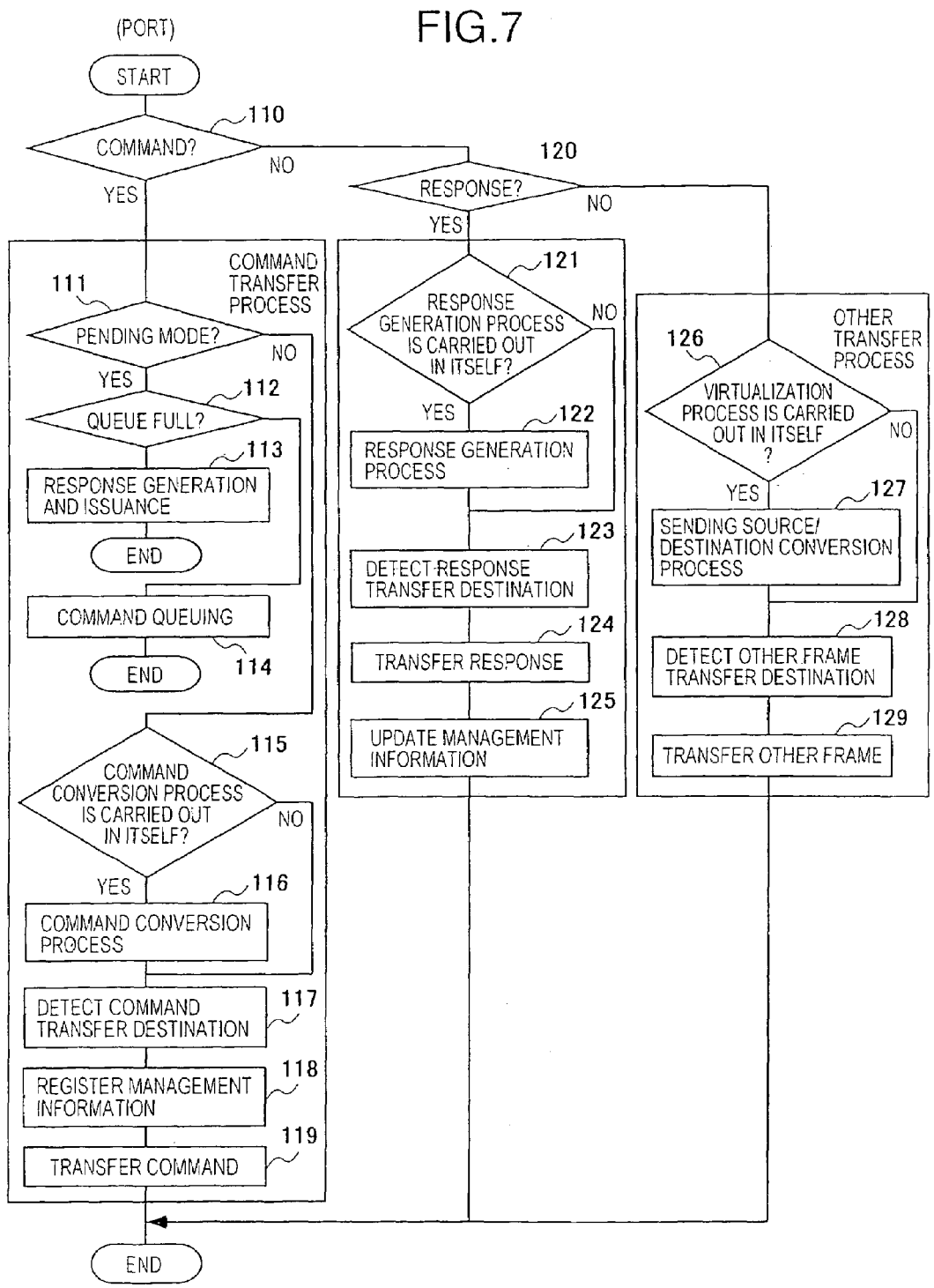
FIG. 7 is flowchart to explain processing operations of a frame data transfer process executed by ports constituting the virtualization controller.

FIG. 7 shows a flowchart which explains a processing operation of the frame data transfer process executed by the port 6 that constitutes the virtualization controller 2, and this will be described next. This process is implemented by the virtualization routing processing program 516 of the virtualization routing processor 501 in the port 6, the program being started up with a receipt of frame data from the host computer 1 or from an external storage 3, or with a receipt of frame data from one module to another module, which constitute the virtualization controller 2.

1. In the Case of "Command Frame":

(1) The port 6 of the virtualization controller 2 which has received frame data detects a type of the frame data thus received by use of the type information included therein, determines whether or not the frame data thus received is a command frame. If the frame data thus received is a command frame, the command transfer processing program 513 executes a process for transferring the command frame as the following (step 110).

(2) At first, the command transfer processing program 513 detects whether or not a mode set at the time of path switching processing described below is a pending mode by use of the command processing mode 535 of the volume mapping information 511 (step 111).

(3) If it is detected that the command processing mode is a pending mode according to the detection in step 111, it is further determined whether or not the command frame thus received is available for queuing based on whether the queue is full or not. If the queue is full and the queuing is disapproved, a response frame including status information indicating that the command frame is not receivable (e.g., queue full) is generated and issued, and then, the above series of processes are ended (step 112, 113).

(4) If it is determined in step 112 that the command frame is available for queuing, not queue full, the command frame is placed in queuing and the above series of processes are suspended. As for thus suspended transferring process of the command frame is restarted in the path switching process as described below (step 114).

(5) If it is detected in step 111 that the command processing mode is not pending mode, that is, the mode is set to normal mode, it is further determined whether or not a command conversion process as described below is carried out by the port 6 itself, by use of the sending destination identification information of the frame data included in the received frame data, and if necessary, further using various information included in the received frame data (e.g., LUN of the sending destination) and the volume mapping information 511 (step 115).

One example of the determination will be explained: When the Port ID or LUN of the sending destination is registered in the virtual volume management information 531 of the volume mapping information 511, and when the virtualization processing module management information 533 registers the identification information of the port 6 itself, the command is determined to be a frame data which requires a command conversion process in the port 6 itself.

(6) When it is determined in step 115 that the command conversion process in the port 6 itself is necessary, the conversion process is carried out in the following manner: By use of the virtual volume management information 531 and the real volume management information 532 of the volume mapping information 511, the sending destination identification information included in the command frame thus received is replaced with an identification information corresponding to the real volume, the sending source identification information is replaced with the identification information of the port 6 itself, and the access request (command) information of LUN and the like is replaced with the access request information of LUN and the like corresponding to the real volume (step 116).

(7) When it is determined in step 115 that the command conversion process in the port 6 itself is not necessary, or after the command conversion process in step 116 is carried out, a destination for transferring the command frame is detected by use of the virtualization processing module management information 533 of the volume mapping information 511 (in the case of In Port) or by use of the real volume management information 532 (in the case of Out Port) (step 117).

(8) Next, the command transfer processing program 513 registers as a sending source management information 541 and a sending destination management information 542 of the virtualization routing control information 512, the sending source identification information included in the received command frame, the command identification information, the sending destination identification information for identifying the transferring destination of the command frame, and the command identification information generated by the port 6 itself (step 118).

(9) Further, the command transfer processing program 513 replaces the command identification information included in the received command frame with the command identification information generated by the port 6 itself, sends the information to the transferring destination of the command frame detected as described above, and ends a series of command frame transferring processes (step 119).

2. In the Case of "Response Frame":

(10) When the frame data thus received is not a command frame in the determination in step 110, it is further determined whether or not the received frame data is a response frame, and when the received frame data is a response frame, the response transfer processing program 514 executes the following response transfer processing (step 120).

(11) At first, the response transfer processing program 514 determines whether or not a response generating process is necessary in the port 6 itself, by use of the command identification information included in the response frame thus received and the volume mapping information 511 (step 121).

An example of the determination will be explained as follows: The response frame is determined to be a frame data requiring a response generating process in the port 6 itself when the identification information of the sending source included in the response frame thus received is registered in the real volume management information 532 of the volume mapping information 511, and the identification information of the port itself is registered in the virtualization processing module management information 533.

(12) When it is determined in step 121 that the response generating process in the port 6 itself is necessary, the response generating process is carried out by replacing the sending source identification information included in the received response frame with identification information corresponding to the virtual volume, and replacing the sending destination identification information with the identification information of the corresponding host computer 1, by use of the virtual volume management information 531 of the volume mapping information 511, and based on the status information included in the received response frame, a process for generating new status information for replacement is carried out if necessary (step 122).

(13) When it is determined that the response generating process in the port itself is not necessary in the determination in step 121, or after the response generating process in step 122 is carried out, a transfer destination of the response frame is detected by use of the command identification information included in the received frame data and the virtualization routing control information 512 (step 123)

An example of detecting the transfer destination will be explained. The detection of the transfer destination is carried out such that command management information of the sending destination management information 542 in the virtualization routing control information 512 corresponding to the command identification information included in the received frame data is detected. Then, sending source identification information of the sending source management information 541 corresponding to the command management information is detected as a transfer destination of the response frame.

(14) Further, the response transfer processing program 514 replaces the command identification information included in the received response frame with corresponding sending source command identification information of the sending source management information 541 in the virtualization routing control information 512, and sends the replaced information to the transfer destination of the response frame detected as described above (step 124).

(15) Further, the response transfer processing program 514 carries out updating of management information by deleting corresponding entries (sending destination/sending source management information) of the virtualization routing control information 512 based on the command identification information included in the received response frame, and ends a series of response frame transfer processes (step 125).

3. In the case of a frame other than that as described above:

(16) If the frame data thus received is not a response frame in the determination in step 120, that is, the frame is neither the command frame nor the response frame, the other transfer processing program 515 executes the following frame data transfer processing.

(17) At first, other transfer processing programs 515 uses the frame data sending destination/sending source identification information and the command identification information included in the received frame data, the volume mapping information 511 and the virtualization routing control information 512, so as to determine whether or not a virtualization process in the port 6 itself is necessary (step 126).

An example of the determination will be explained as follows: The response is determined to be a frame data which requires a virtualization processing in the port 6 itself, when the sending destination identification information or the sending source identification information is registered in the real volume management information 532 or the virtual volume management information 531 of the volume mapping information 511, and identification information of the port 6 itself is registered in the virtualization processing module management information 533.

(18) When it is determined in step 126 that the virtualization (sending source/sending destination identification information conversion) process in the port 6 itself is necessary, a virtualization process is carried out by replacing the sending source identification information or the sending destination identification information included in the received frame data is replaced with the identification information of the virtual volume or by the identification information of the real volume, by use of the virtual volume management information 531 and the real volume management information 532 of the volume mapping information 511 (step 127).

An example of the above process will be explained as follows: This process is carried out such that when the identification information of the sending destination included in the received frame data corresponds to the identification information of the virtual volume (from the host computer to the virtualization controller), the identification information of the sending destination is replaced with the identification information of the real volume, or when the identification information of the sending source included in the received frame data corresponds to the identification information of the real volume (from the virtualization controller to the host computer), the identification information of the sending source is replaced with the identification information of the virtual volume.

(19) When it is determined in step 126 that the virtualization process in the port 6 itself is not necessary or after the conversion process in step 127 is carried out, the other transfer processing program 515 detects a frame data transfer destination by use of the command identification information included in the received frame data and the virtualization routing control information 512 (step 128).

One example of the aforementioned transfer destination detecting process will be explained as follows. The transfer destination detecting process, for example, is carried out detecting command identification information of the sending source management information 541 in the virtualization routing control information 512 corresponding to the command identification information included in the received frame data, and also detecting the sending destination identification information of the sending destination management information 542 corresponding to the detected command identification information as a frame data transfer destination.

(20) Further, the other transfer processing programs 515 replaces the command identification information included in the received frame data with the sending source command identification information corresponding to the sending source management information 541 of the virtualization routing control information 512, the replaced information is sent to the frame data transfer destination detected as described above, and ends a series of processes (step 129).

In the explanations regarding the flow as described above, for the purpose of simplification, the identification information items of the port 6 for the external module (identification information used between the port 6 and the host computer 1 or the storage 3), is same as that for the internal module (identification information used between the port 6 and the other modules within the virtualization controller 2). However, the present invention is not limited to this configuration and if each has independent identification information, it is sufficient to have information for associating those information items.

Figure 8:
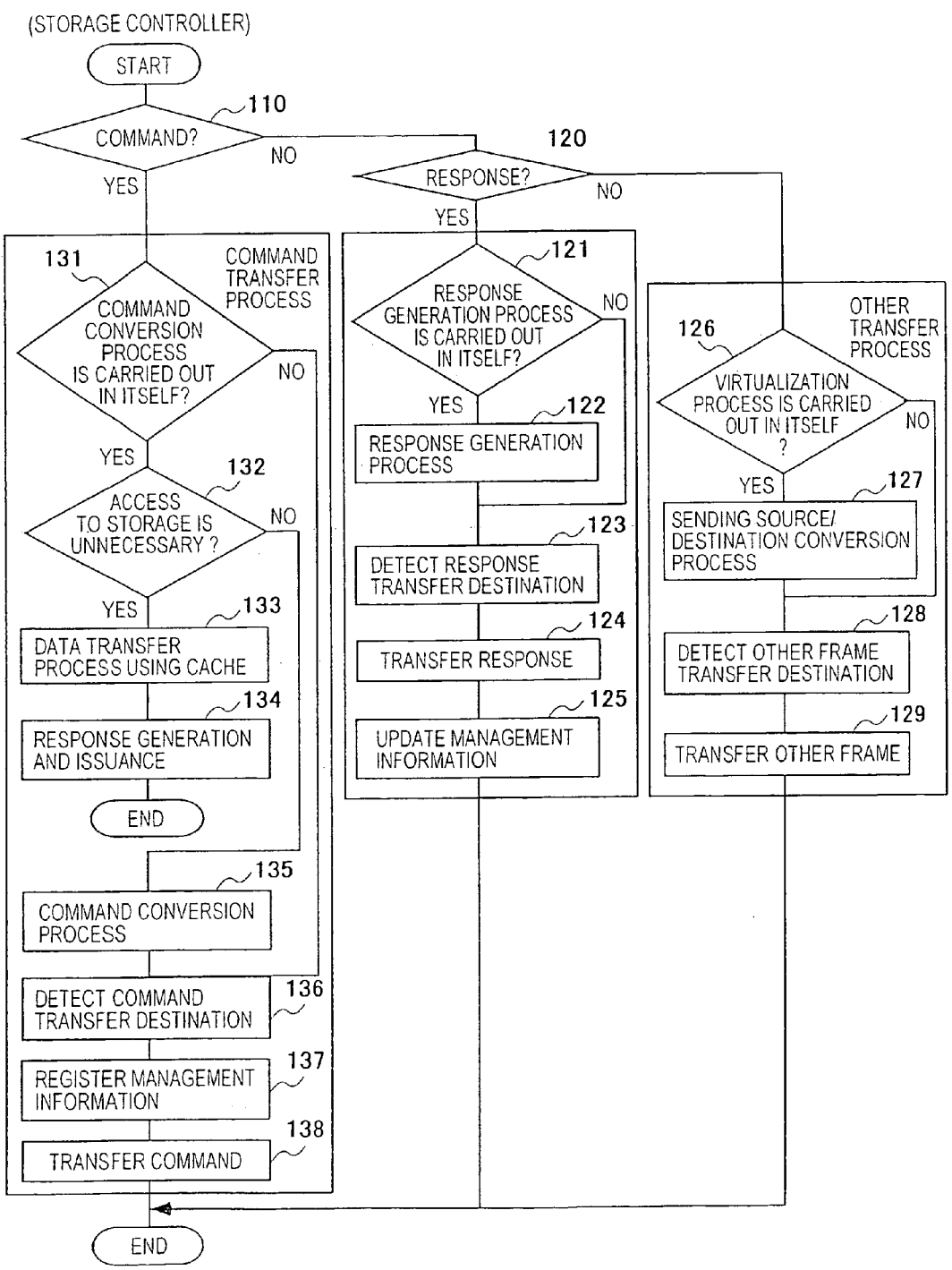
FIG. 8 is flowchart to explain processing operations of the frame data transfer process executed by a storage controller constituting the virtualization controller.

FIG. 8 shows a flowchart which explains processing operations of the frame data transfer process executed by the storage controller 7 that constitutes the virtualization controller 2, and this flow will be described next. This process is implemented by the virtualization routing processing program 516 of the virtualization routing processor 501 in the storage controller 7, the program being started upon receipt of frame data from the port 6.

1. In the Case of "Command Frame":

(1) Similar to the case of the aforementioned port 6, the storage controller 7 of the virtualization controller 2 which has received the frame data detects a type of the frame data thus received, determines whether or not the frame data thus received is a command frame. If the received frame data is a command frame, the command transfer processing program 513 executes a command frame transfer process (step 110).

(2) At first, it is determined whether or not a command conversion process as described below is carried out by the storage controller 7 itself, by use of the sending destination identification information of the frame data included in the received frame data, and if necessary, further using various information included in the received frame data (e.g., LUN of the sending destination) and the volume mapping information 511 (step 131).

One example of the determination will be explained: When the Port ID or LUN of the sending destination is registered in the virtual volume management information 531 of the volume mapping information 511, and when the virtualization processing module management information 533 registers the identification information of the storage controller 7 itself, the command is determined to be a frame data which requires a command conversion process in the storage controller 7 itself.

(3) According to the determination in step 131, when it is determined that the command conversion process by itself is necessary, it is determined whether or not an access to the storage 3 is necessary prior to the command conversion process (step 132).

The determination whether or not the access is necessary is made such that when the access request from the host computer 1 is a read command, and the data targeted by the read request is stored in the cache 75 in the storage controller 7 itself, it is determined that the access request from the host computer 1 can be executed without carrying out the access (read process) to the storage 3. It is to be noted that the determination whether or not the access to the storage 3 is necessary is not limited to the example as described above.

(4) When it is determined in step 132 that the access to the storage is not necessary, the command transfer processing program 513 executes data transfer processing carried out between the storage controller 7 and the host computer 1 by use of the cache 75 in the storage controller 7 itself. Further, a response frame including the status information which is a result of executing the access request is generated and issued, and then, a series of processes are ended (step 133, 134).

(5) When it is determined that the access to the storage is necessary in the determination in step 132, the command transfer processing program 513 carries out the following process as a command conversion process: By use of the virtual volume management information 531 and the real volume management information 532 of the volume mapping information 511, the sending destination identification information included in the command frame thus received is replaced with identification information corresponding to the real volume, the sending source identification information is replaced with the identification information of the storage controller 7 itself, the access request (command) information of LUN and the like is replaced with the access request information of LUN and the like corresponding to the real volume (step 135).

As a command conversion process in the aforementioned storage controller 7, it is possible to execute a control for presenting to the host computer 1 a plurality of physical disk devices, for examples, as one logical storage. It is also possible to add and store parity data as redundant data for the data to which the host computer 1 accesses. With this configuration, even if there is a trouble in arbitrary one disk device, it is further possible to execute a series of parity control and the like which enable a data transfer process with the host computer 1 by use of the above parity data. In that case, it is necessary to hold in the storage controller 7 a processing program to execute the above control and related control information. However, the aforementioned disk array control in the storage controller 7 does not have a direct relationship with the present invention. Therefore, detailed explanation thereof will be omitted.

(6) When it is determined that the command conversion process in the storage controller 7 itself is not necessary in the determination in step 131, or after the command conversion process in step 135 is carried out, the command transfer processing program 513 detects a command frame transfer destination, by use of the storage connection module management information 534 of the volume mapping information 511 (step 136).

(7) Next, the command transfer processing program 513 registers as sending source management information 541 and sending destination management information 542 of the virtualization routing control information 512, the sending source identification information and the command identification information included in the command frame thus received, the sending destination identification information for identifying the command frame transfer destination, and the command identification information generated by the storage controller itself (step 137).

(8) Further, the command transfer processing program 513 replaces the command identification information included in the command frame thus received with identification information generated by the storage controller 7 itself, transfers the replaced information to the command frame transfer destination detected above, and ends a series of command frame transfer processes (step 138).

2. In the Case of Other than Command Frame:

The processes in the case where the received frame data is other than the command frame in the determination in step 110 are equivalent to those explained in the flow of FIG. 7. Therefore, the explanation thereof will be omitted.

Further, in the aforementioned explanation as to the flow shown in FIG. 8, details of the determination process whether or not accessing to the storage is necessary and the data transfer process carried out with the host computer 1 by use of the cache 75 in the storage controller 7 itself are omitted. However, these processes can be implemented by processes equivalent to a cache control in a conventional storage device.

Figure 9:
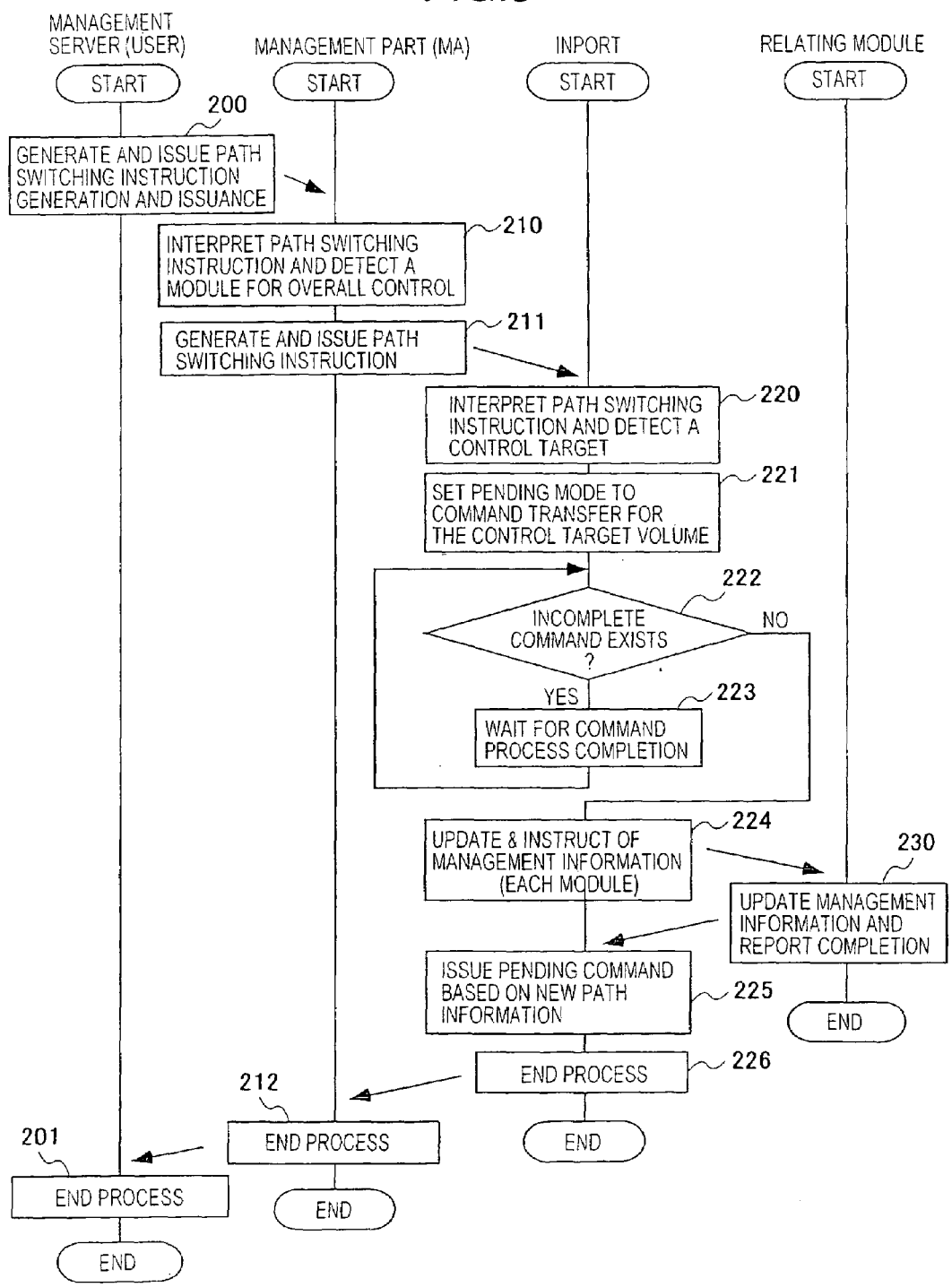
FIG. 9 is flowchart to explain an example of processing operations of path switching process.

FIG. 9 shows a flowchart which explains processing operations of the path switching process. Next, with reference to FIG. 9, one example of the path switching process in the embodiment of the present invention will be explained. In the first embodiment of the present invention being explained, the path switching process is executed upon receipt of an access switching instruction, the instruction being issued to the virtualization controller 2 from the management server 4 according to an instruction of a system administrator.

1. Generation and Issuance of Path Switching Instruction:

(1) At first, according to the instruction of the system administrator, the management server 4 generates an access path switching instruction for an arbitrary virtual volume, and issues this switching direction to the virtualization controller 2 (step 200).

The access path switching instruction is implemented by instructing a change of the virtualization processing module management information 533 of the volume mapping information 511 by use of the volume mapping management information 411. The management server 4 carries out generation and issuance of the access path switching instruction according to the instruction of the system administrator, by executing the volume management program 414.

(2) The access path switching instruction from the management server 4 is received by the management part 8 of the virtualization controller 2, and the path switching processing program 520 of the management part 8 is started up. Then, the path switching processing program 520 of the management part 8 detects a module for carrying out an overall control of the path switching process, based on the aforementioned access path switching instruction information (for example, volume mapping management information 411 which changed the virtualization processing module management information 533) and the volume mapping information 511 held in the management part 8 itself. Then, a path switching instruction for the detected module, which is similar to the one received by the management part 8 itself is generated and issued (step 210, 211).

In the example explained here, it is assumed that overall control of the access path switching process is carried out between the host computer 1 and the port 6 (In Port), and the aforementioned path switching instruction from the management part 8 is received by the port 6 (In Port).

(3) The port 6 (In Port) which received the path switching instruction from the management part 8 starts up the path switching processing program 520 in the port 6 itself. The path switching processing program 520 of the port 6 (In Port) detects a volume and a module to be controlled by the path switching process, based on the path switching instruction and the volume mapping information 511 held by the port itself, and sets "pending mode" as a command processing mode of the volume mapping information 511 corresponding to the detected volume to be controlled (step 220, 221).

Subsequently, the access request (command) from the host computer 1 to this volume is processed according to the processing procedures of the aforementioned command transfer processing program.

(4) The path switching processing program 520 of the port 6 (In Port) detects whether or not there is an incomplete command to the volume to be controlled by the path switching process. The detection whether or not there is an incomplete command can be determined by searching whether or not a volume to be controlled by the path switching control is registered in the virtualization routing control information 512 (step 222)

(5) In the detection whether or not there is an incomplete command in step 222, when it is detected that there is any incomplete command, individual command processing is continued until it is completed and until incomplete command goes out of existence (step 223).

(6) In the detection whether or not there is an incomplete command in step 222, when it is detected there is no incomplete command, or it is detected that the incomplete command has gone out of existence, the path switching processing program 520 of the port 6 (In Port) issues to related modules (modules to be controlled) an updating request as to the volume mapping information 511 held and managed respectively (step 224).

(7) Each module which received the updating request for the volume mapping information 511 in step 224 carries out updating the volume mapping information 511 based on the request, and issues a completion report to the port 6 (In Port) (step 230).

(8) The port 6 (In Port) received a completion of updating the volume mapping information 511 issues a command frame suspended after the command queuing in the process in step 114 in the flow of the command transfer processing program in FIG. 7 as described above, based on a new access path information (step 225)

(9) Subsequently, the path switching processing program 520 of the port 6 (In Port) reports to the management part 8 the completion of the path switching processing, and a series of processes are ended (step 226).

(10) The management part 8 that received a completion report from the port 6 (In Port) reports to the management server 4 the completion of the path switching processing, and a series of processes are ended (step 212).

(11) The management server 4 which received the completion report from the management part 8 carries out updating of the volume mapping management information 411 or reporting the completion to the system administrator, if necessary, and a series of processes are ended (step 201).

According to the processes as described above, it is possible to carry out a switching (optimization) process based on an instruction from the system administrator, between the first access path (a path through which the host computer 1 and the storage 3 are connected via the port 6-1 (In Port), storage controller 7, and port 6-2 (Out Port)), and the second access path (a path through which the host computer 1 and the storage 3 are connected via the port 6-1 (In Port) and the port 6-2 (Out Port)).

As mentioned above, since the first access path is an access path via the cache 75 of the storage controller 7, it is set as an access path to the volume having an access characteristic that a cache effect can be expected, and the other second access path is set as an access path to the volume having an access characteristic that the cache effect is hardly expected. With this configuration, it is possible to effectively utilize the cache 75 (prevention of cache resource waste) and to enhance the access performance of the storage viewed from the host computer in higher level (speed-up of the access request processing for the volume with high accessing frequency).

For the data transfer process in which it is not necessary to expect the effect of the cache 75, it is possible to obtain another effect that band of the backplane 9 can be efficiently utilized by carrying out the data transfer processing directly between the ports 6-1 and 6-2 (between In Port and Out Port). It is because the data transfer via the storage controller 7 has to use the backplane 9 two times, whereas the data transfer between the ports uses the backplane 9 just once.

In the present invention, currently the second access path is set, for example. However, it is possible to control such that the access path to the volume allocated to the application which expects a subsequent increase of accessing frequency, is switched from the second access path to the first access path, for example. On the other hand, even if the first path is set currently, it is possible control such that the access path to the volume allocated to the application which expects a subsequent decrease of accessing frequency, is switched from the first access path to the second access path.

In the example as described above, it is also possible to allocate a volume of the storage for each application. Further, in the aforementioned description, a process is explained with an example of carrying out an access path switching process between the host computer and the storage, upon receipt of an instruction from the system administrator. However, the present invention is not limited to the above example.

Next, another example as to the access path switching process between the host computer and the storage according to the second embodiment of the present invention will be explained. The second embodiment of the present invention explained here is an example of controlling the access path switching based on scheduling information. A configuration as a computer system may be equivalent to that as shown in FIG. 1.

Figure 10:
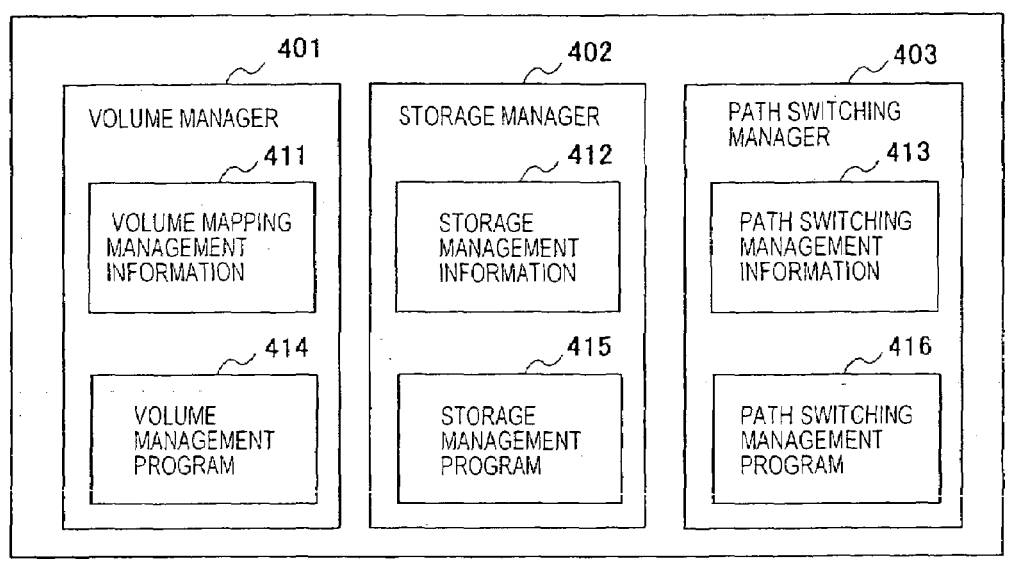
FIG. 10 is a diagram showing programs and management information items stored in the recording medium of the management server according to the second embodiment of the present invention.

FIG. 10 is a diagram showing an example of programs which are stored in the recording medium 42 of the management server 4, and which are read out by the memory 41 to be executed by the CPU 40, and management information items stored in the recording medium 42 of the management server 4.

An example shown in FIG. 10 is a configuration same as the aforementioned example shown in FIG. 2 except that a path switching manager 403 having a path switching management information 413 and a path switching management program 416 is newly provided.

The path switching management program 416 is executed to read the volume mapping information 511 from the virtualization controller 2 and to output the information as access path information to the output device or to notify a system administrator of the information. Further, the program is executed to receive registration information or update information from the system administrator to the path switching management information 413, and to set these information items in the virtualization controller 2. The path switching management information 413 comprises path switching control information 519 received from the virtualization controller 2, the registration information and update information received from the system administrator. The path switching manager 403 is implemented by executing the path switching management program 416 by the CPU 40 of the management server 4, by use of the path switching management information 413.

In the description above, the information registered in the path switching information 413 by an instruction from the system administrator includes switching path information which designates how the access path is switched and schedule information which designates when the access path switching process is executed.

Programs executed by the CPU and management information items in any of the modules (ports 6-1, 6-2, storage controller 2, management part 8) constituting the virtualization controller 2 are same as the case in the first embodiments already explained with FIG. 3, except that processing contents of the path switching processor 503 in the port 6 (In Port) are different partly.

Next, an example of the configuration and process of the path switching processor 503 in the port 6 (In Port) in the second embodiment will be explained.

The path switching processor 503 stores the path switching management information 413 (switching path information, schedule information) received from the management server 4 via the management part 8, as path switching control information 519.

The path switching processing program 520 includes a program which executes the actual access path switching process as described above based on the switching path information held as the aforementioned path switching control information 519, and a program which executes a start-up control of the access path switching process based on the schedule information held as aforementioned path switching control information 519.

Then, the program which executes the start-up control of the access path switching process detects by the port itself a timing for switching the path, which substitute the path switching instruction from the management part 8 in the first embodiment, and executes the subsequent access path switching processes.

In the access path switching process in the second embodiment of the present invention, other processes (access path switching process: process steps 224 to 226 and process step 230 in the related modules as shown in FIG. 9) are equivalent to those in the first embodiment, except that the start-up control of the access path switching process is different. Therefore, the explanation of overlapping processes will be omitted.

According to the second embodiment of the present invention, the access path switching (optimizing) process, which occurs frequently, can be executed without being triggered by the instruction from the system administrator. For example, in a circumstance where the storage is used by allocating its volume by application, if increase and decrease of the access frequency by application are predictable, the aforementioned schedule information can be set previously. With this configuration, the virtualization controller can autonomously execute the start-up control of the access path switching process, resulting in a reduction of load on the system administrator.

Here, optimization of the access path means the following: when there are a plurality of access paths available between the host computer and the storage, an access path is set (and switched, if necessary) which is capable of effectively utilizing at the maximum the resources (internal network (backplane 9) band, cache, processor and the like) existing on the access path, based on the access trend with respect to each volume of the storage. Accordingly, it is possible to achieve an effective use of the resources and enhancement of system performance.

In the explanation as described above, a case was illustrated as an example where an instruction from the system administrator (path switching management information 413) is transferred to the port 6 from the management server 4 via the management part 8. However, the present invention is not limited to the above example. It is also possible to send the instruction from the management server 4 directly to the port 6 which is to be controlled. In the explanation as described above, a case was illustrated as an example where a timing of access path switching process is detected in the port 6 based on the path switching information 413 from the system administrator. However, the present invention is not limited to the above example. For instance, it is also possible that the management server 4 which received the instruction from the system administrator executes the start-up control of the access path switching process to the virtualization controller 2 (controls the timing for issuing the access path switching instruction in the management server 4). In this case, the configuration of the virtualization controller 2 may be same as that of the first embodiment.

In the second embodiment of the present invention as described above, a case was illustrated as an example where the access path switching process is carried out based on the increase/decrease prediction as to the access frequency by the system administrator, or based on the increase/decrease prediction as to the access frequency which can expect a cache effect. However, the present invention is not limited to this example.

Next, another example regarding the access path switching process between the host computer and the storage will be explained as the third embodiment. The third embodiment of the present invention explained here is an example that the access path switching control is carried out based on a setup condition and an increase/degrease prediction as to the access frequency according to the virtualization controller. It is to be noted that the configuration as a computer system may be equivalent to that of FIG. 1.

Figure 11:
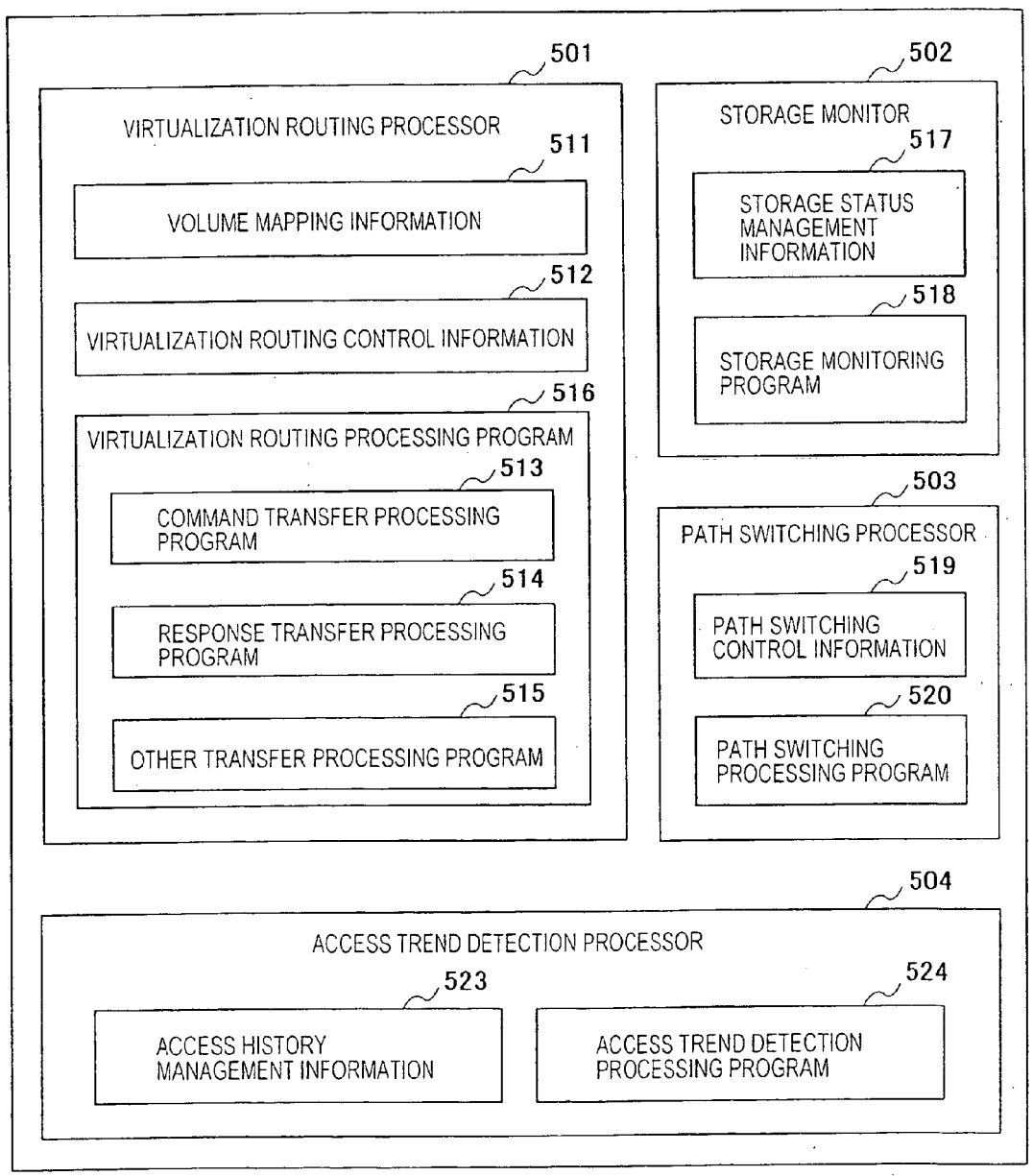
FIG. 11 is a diagram showing an example of programs executed in the port (In Port) and management information items of the virtualization controller according to the third embodiment of the present invention.

FIG. 11 is a diagram showing an example of programs executed by the CPU 60 in the port 6 (In Port) and management information items in the virtualization controller 2, according to the third embodiment of the present invention.

An example as shown in FIG. 11 has a same configuration as that of FIG. 3, except that an access trend detecting processor 504 including the access history management information 523 and the access trend detection processing program 524 is newly provided.

In the above description, the access history management information 523 is generated and held by the access trend detection processing program 524 which monitors a command frame transferred between the host computer 1 and the storage 3. The access history management information 523 includes a number of accessing times by volume and by access type as described below. The access trend detection processing program 524 issues an access path switching instruction to the path switching processor 503 as shown in FIG. 3, based on the access history management information 523.

Since the contents of the information items and processing programs held and managed in each processor other than the access trend detecting processor 504, are approximately same as that of the aforementioned second embodiment. Therefore, a detailed explanation thereof will be omitted.

FIG. 12 is a table showing an example of access types which are detected by the access trend detection processing program 524. As shown in FIG. 12, the access type information 550 is classified into a read type access which executes data read-out, and a write type access which executes data write-in. These accesses are further classified into proximal address access, identical address access, continuous address access and other access.

In the description above, the accesses classified into the other address are the ones which cannot be associated with the previous access (which are not classified into proximal and continuous addresses). However, the accesses classified into the other addresses include an access which may be associated with a subsequent access (may be classified into proximal, continuous). Therefore, it is considered to be a history information item which may be reduced. On the other hand, the history information (a number of accessing times) besides the other address is the one that will not be reduced, except the case that it is cleared upon initialization and the like.

Further, as shown in FIG. 12, each access thus classified can be provided with a weighed factor by access type. The weighed factor 551 is used as a condition for calculating a priority at the time of start-up control in the path switching process as described below. The example as shown in FIG. 12 shows that a large value is set to the access type with which a cache effect can be expected, whereas a small value is set to the access type with which a cache effect cannot be expected.

Actual usage environment and the like may largely influence whether or not the cache effect can be expected, and to what extent the address is classified as proximal address with respect to variations of the accessing region. Therefore, it is desirable that the aforementioned weighed factor can be set separately, with arbitrary values by the system administrator and the like.

FIG. 13 is a diagram showing an example of the access history management information 523, which is managed by the port 6 (In Port).

In FIG. 13, the access history management information 523 holds by volume the number of accessing 552 by access type at an arbitrary timing. Further, the information of the number of accessing in the access history management information 523 is registered and updated by the access trend detection processing program 524, which analyzes access request information from the host computer 1. In FIG. 13, an example where values as a number of accessing times are registered respectively for the volumes (LUN=0/1/2/3) is illustrated.

Here, a priority calculated value (point) is calculated by volume, based on the weighed factor shown in FIG. 12, as a sum of products of the weighed factor and the numbers of accessing indicated in the access history management information 523 as shown in FIG. 13. The calculation results are: LUN0 has 310 points, LUN1 has 170 points, LUN2 has −70 points, and LUN3 has −200 points. Here, LUN0 has the highest priority, and LUN1, LUN2, and LUN3 follow in this priority order. Then, it is determined that setting of the current access path as shown in FIG. 5 (LUN0/1 is set as the first access path, LUN2/3 is set as the second access path) is adequate.

The process which detects the aforementioned priorities and verifies an adequacy of the current access path setting is executed by the access trend detection processing program 524.

FIG. 14 is a diagram showing an example of the access history management information 523 at an arbitrary timing, and comparing to the access trend as shown in the example of FIG. 13, it shows an example that the occurrence frequency of the continuous address reading in the access trend of LUN0 is high.

Similar to the aforementioned case, each volume indicated in the access history management information 523 as shown in FIG. 14, is subjected to the aforementioned calculation to obtain priority calculated values, based on the weighed factor. Then, LUN0 has −170 points and priority becomes the third, and the access trend detection processing program 524 determines that the access path setting as shown in FIG. 5 is not adequate. As a result, the access trend detection processing program 524 issues to the aforementioned path switching processor 503 an access path switching instruction (in the example being explained, a request for switching the access path of LUN0 from the first access path to the second access path).

Then, the path switching processor 503 which received the aforementioned access path switching request can execute a process identical to the access path switching process as described above.

As for the access path to LUN2 having the second priority as a result of the aforementioned priority calculation based on the weighed factor, a similar process is executed and it is possible to implement the access path switching process (a process for switching the access path of LUN2 from the second access path to the first access path).

In the aforementioned description, it has been explained such that as an access path switching process based on the priority calculated result, the first access path is set for the access paths up to the second priority, and the second access path is set to the access paths having the subsequent priority. However, the present invention is not limited to this example. For instance, the access path setting may be carried out based on whether a calculated point for deciding the aforementioned priority becomes plus or minus.

According to the third embodiment of the present invention, it is possible to execute the access path switching (optimization) process based on the actual access trend by carrying out the aforementioned processes, without being triggered by an instruction from the system administrator. Further, this access path switching (optimization) process can be executed even when a change in the access trend occurs, which is unpredictable by the system administrator. Therefore, a load onto the administrator may be further reduced.

The third embodiment of the present invention as described above has been explained assuming that the access path switching control is carried out based on the access trend (a number of accessing times by volume and by access type) at an arbitrary timing. However, the present invention is not limited to this example. For instance, it is possible to have other conditions for the access path switching process and control the process with the combination thereof. In this case, for example, it may be possible to hold weighed information by volume as path switching control information 519 so that the path switching processing program 520 integrally determines whether or not the switching process is necessary.

With the processes as described above, it is possible to carry out an access path setting which does not depend on only the access trend, without setting depending on only the access trend as described above. For example, when an arbitrary volume is provided to a user, a charging condition therefor can be considered as weighed information by volume. Then, the first access path is set to a particular volume having less access frequency but high charge, whereas the second access path is set to a particular volume having a high access frequency but low charge. Then, it is possible to conduct a control so that the access path switching process with a condition of the access trend as described above is executed, when the charge is equivalent.

In the aforementioned third embodiment of the present invention, an example has been explained that the first access path and the second access path are switched as an access path switching process. However, the present invention is not limited to this example. For instance, it is also possible to switch the storage controllers existing on the access path in the first access path.

Next, another example regarding the access path switching process between the host computer and the storage according to the fourth embodiment of the present invention will be explained. The fourth embodiment of the present invention is an example to control the access path switching where the switching (changing) between modules is carried out based on a usage rate of each module in the virtualization controller 2, which provides equivalent functions. According to the fourth embodiment of the present invention explained here, a resource usage status of each of the modules constituting the virtualization controller 2 is managed overall and an access path switching (optimization) processing is executed based on the resource usage status. Accordingly, for example, it is possible to implement a load distribution of cache 75, CPU 70 and the like in a plurality of storage controllers 7, and as a result, a system performance can be enhanced. It is to be noted that the configuration as a computer system may be equivalent to the one as shown in FIG. 1.

Figure 15:
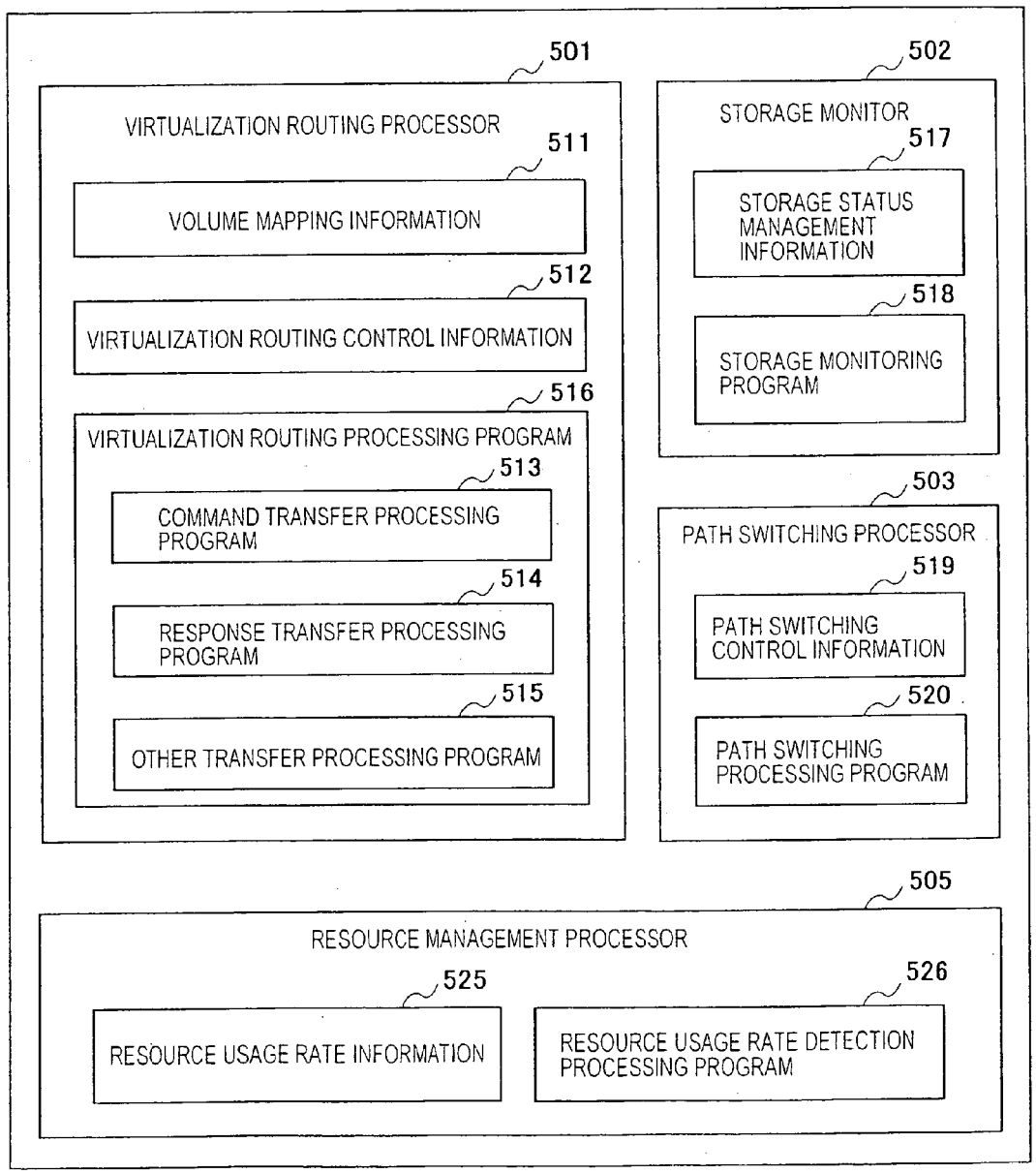
FIG. 15 is a diagram showing an example of programs and management information items in any of the modules constituting the virtualization controller according to the fourth embodiment of the present invention.

FIG. 15 is a diagram showing an example of programs and management information items in any of the modules (port 6, storage controller 7) constituting the virtualization controller 2 according to the fourth embodiment of the present invention.

An example as shown in FIG. 15 has a same configuration as that of FIG. 3, except that a resource management processor 505, including resource usage rate information 525 and a resource usage rate detection processing program 526, is newly provided.

It is to be noted that the programs and the management information items in the management part 8 have an equivalent configuration as that of FIG. 3 as described above, except that a part of the processing described below is different. Therefore, the explanation thereof will be omitted.

The resource usage rate information 525 is collected and held as a result of monitoring the usage status (usage rate) as to the processor, cache and the like which are resources of the module itself, by the resource usage rate detection processing program 526.

Next, an example of path switching process according to the fourth embodiment of the present invention will be explained, assuming that in the management part 8 of the virtualization controller 2, the usage status of recourses (cache) in a plurality of storage controllers 7 constituting the virtualization controller 2 is managed overall, and an access path switching (optimization) process is executed based on the usage status of these resources.

Figure 16:
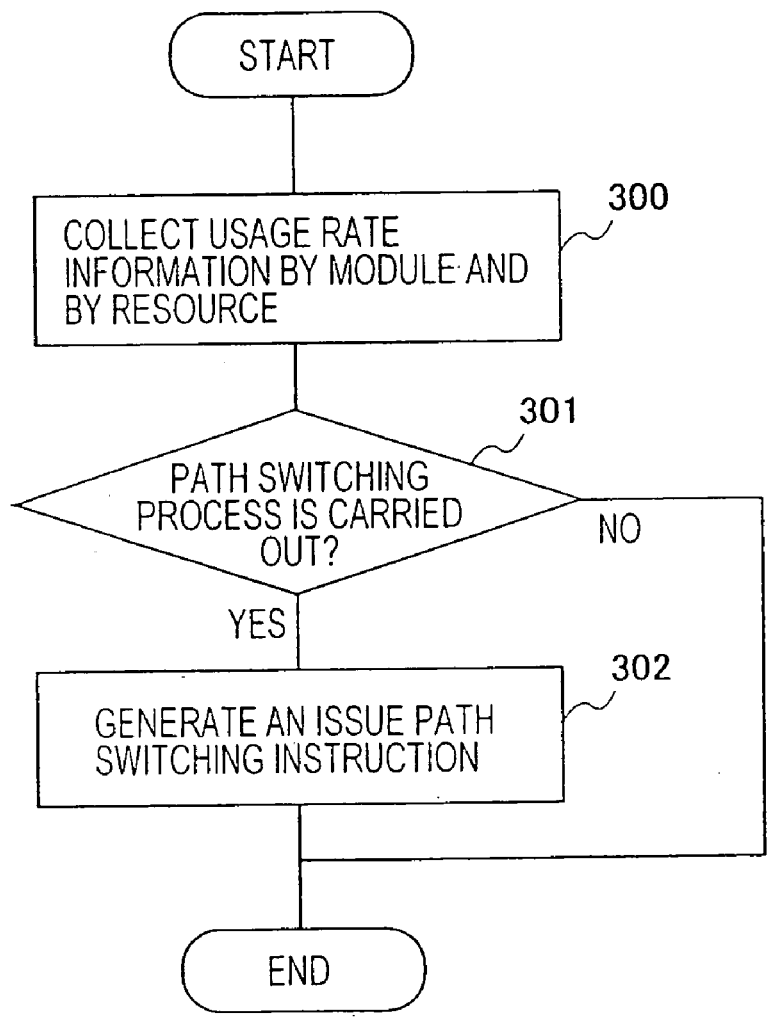
FIG. 16 is a flowchart to explain processing operations for controlling start-up (generation of a path switching instruction and issuance thereof) of the path switching process of the management part according to the fourth embodiment of the present invention.

FIG. 16 is a flowchart explaining processing operations for controlling a path switching process startup (generation and issuance of the path switching instruction) in the management part 8 according to the fourth embodiment. Next, an explanation will be made regarding the operations.

1. Collection of Usage Rate Information (Step 300):

At first, the management part 8 issues an inquiry request regarding the resource usage status (usage rate) to each of the storage controllers 7 constituting the virtualization controller 2, and holds the resource usage status reported from each of the storage controllers 7 as path switching control information 519.

2. Determination as to Path Switching Processing Execution (Step 301):

Next, the management part 8 determines whether or not the access path switching process is executed, by use of information such as the access path switching conditions based on the resource usage rate, which is previously set to be held by the management server 4 according to an instruction of a system administrator, and the like as path switching control information 519, and information of usage rate and the like of each resource collected in the process in step 300. This determination is made in the manner as the following: it is determined whether or not the access path switching process is necessary, based on the resource usage rate reported from each of the storage controllers 7, whether it goes over or does not go over the uppermost value of the usage rate by resource, which is set as a condition for the access path switching. Further, if the resource usage rate goes over the threshold (it is determined the access path switching is necessary) in a particular storage controller 7, it is detected whether or not there is a volume available for transferring the virtualization process to another storage controller 7, out of the volumes in the storage controller 7 set as virtualization processing module whose usage rate goes over the threshold, and another storage controller 7 is further detected as a destination of transferring, based on the resource usage status reported from each of the storage controllers 7.

3. Generation and Issuance of Path Switching Instruction (Step 302):

When the access path switching process is executed, the management part 8 generates path switching control information 505 including a switching source and a switching destination of the access path detected by the determination as to path switching processing execution in step 301, and issues an access path switching instruction to the port 6 (In Port).

Subsequent access path switching process is same as the case in each embodiment of the present invention as described above. Therefore, the explanation thereof will be omitted.

By executing the aforementioned process according to the fourth embodiment of the present invention, it is possible to execute the access path switching (optimization) process within the virtualization controller 2 by transferring a process to another equivalent module having extra resources which constitutes the virtualization controller 2, without being triggered by an instruction from the system administrator. Further, it is also possible to execute the above access path switching (optimization) process in the case where there is a change in access trend unpredictable by the system administrator, in particular, even when there is an overload for the resource usage rate in a particular module constituting the virtualization controller 2.

According to the fourth embodiment of the present invention, it is possible to reduce a load on the system administrator, and further achieve an enhancement in a system performance by a load distribution between the modules constituting the virtualization controller 2. An effect according to the load distribution as described above can be expected when additional port 6, storage controller 7 and the like are installed, which constitute the virtualization controller 2.

In the aforementioned fourth embodiment of the present invention, the access path switching control has been explained, based on the usage rate of the cache 75 in the storage controller 7 as a resource of the modules constituting the virtualization controller 2. However, the present invention is not limited to this example. For instance, it is possible to carry out the access path switching control based on the usage rate of CPU 70 in the storage controller 7 or based on the combination of the items above.

The present invention is not limited to the access path switching control based on the resource usage rate of the storage controller 7. For example, it is also possible to implement the access path switching control based on the usage rate of CPU 60 of the port 6, usage rate of the interface controller 63 of the port 6 or the combination thereof.

Further, the aforementioned fourth embodiment of the present invention was explained such that in the management part 8 of the virtualization controller 2, the resource usage status of each of the modules constituting the virtualization controller 2 is managed overall, and based on those resource usage statuses the access path switching (optimization) process is executed. However, the present invention is not limited to this example. For instance, it is also possible to execute in individual modules constituting the virtualization controller 2, the process which is carried out by the management part 8 in the description above.

In that case, a module which constitutes the virtualization controller 2 and executes the access path switching (optimization) process compares a threshold of the usage rate of the resource previously provided and managed by the module itself and the usage status, and when the current usage rate goes over the threshold, it collects usage statuses of various resources in another module providing an equivalent function. Then, it detects a transfer destination based on the resource usage statuses in the other modules thus collected. Subsequently, the module which executes the access path switching (optimizing) process based on the transfer destination thus detected further generates access switching control information 505 including the information of access path switching source and destination, which are detected in the determination as the access path switching process execution in step 301 of FIG. 16 as described above. Then, an access path switching instruction is issued to the port 6 (In Port), and a series of access path switching (optimizing) processes can be started.

In the aforementioned fourth embodiment of the present invention, a control for the management part 8 of the virtualization controller 2 to start a process relating to collection of resource usage rate information of each module can be carried out at particular intervals. However, the present invention is not limited to this example. For instance, it may be possible for each module constituting the virtualization controller 2 compares the threshold of the resource usage rate previously set and managed by the module itself with the usage status, and if the current usage rate goes over the threshold, an access path switching request is issued to the management part 8. Upon receipt of this request, the management part can start collecting the usage rate information as well as starting other processes.

In the aforementioned fourth embodiment of the present invention, it is assumed that an arbitrary module constituting the virtualization controller 2 previously sets and holds control information regarding path switching control based on the resource usage rate as path switching control information 519. However, in the present invention, it is desirable that this control information can be registered, referred to and updated from the system administrator and the like, via the path switching processing program 416 of the management server 4.

In each of the embodiments of the present invention as described above, it has been explained that a control for selecting an optimal access path for switching, out of a plurality of access paths within the virtualization controller which connects the host computer and the storage, without performing data migration process between the storages constituting the storage system, is carried out based on the switching instruction from the system administrator, schedule information set from the system administrator, access trend from the host computer, and usage rate of various resources constituting the virtualization controller. However, the present invention may include other variations. Next, an example of these variations will be explained.

(1) In the case where there is not a one-to-one correspondence between the virtual volume and the real volume:

In the example of the aforementioned each embodiment of the present invention, there is a one-to-one correspondence between the virtual volume and the real volume. However, the present invention is not limited to this example. For instance, it may be possible to apply the present invention in the case where one virtual volume is configured by a plurality of real volumes.

FIG. 17 is a diagram showing an example of the volume mapping information 511 managed by the virtualization controller 2 in the case where one virtual volume is configured by two real volumes. An example as shown in FIG. 17 has a configuration equivalent to that of FIG. 5, except that address information is newly provided in the virtual volume management information 531 in the aforementioned example of FIG. 5.

The example of the volume mapping information 511 as shown in FIG. 17 indicates that in the virtual volume identified by Port ID=P_Pid_1, Port Name=V_Pname_1, LUN=0, the address region of 0h~98967Fh is mapped to the volume of LUN=0 in the storage identified by Port ID=P_Pid_1, Port Name=P_Pname_1, and the address region of 989680h~1312CFFh is mapped to the volume identified by LUN=4 of the storage. Further, in FIG. 17, as a module for executing the virtualization process on the virtual volume identified by Port ID=V_Pid_1, LUN=0, it is desirable that identifier information of a same storage controller 7 (in FIG. 17, Storage Controller #1) is to be set, but it is not limited to this example.

In the above description, a case where one virtual volume is configured by two real volumes has been explained. However, according to the present invention, one virtual volume may be configured by two or more real volumes. Alternatively, a plurality of virtual volumes may be configured by one real volume.

(2) In the case where not all the real volumes in the storage are subjected to the virtualization control:

Each embodiment of the present invention as described above has been explained with an example that all of the volumes in the storage are subjected to the virtualization control. However, the present invention is not limited to this example. For instance, the present invention may be applied to the case where an arbitrary volume of the storage may be provided to the host computer without being subjected to the virtualization process.

FIG. 18 is a diagram showing an example of the volume mapping information 511 managed in the virtualization controller 2, in the case where one volume of the storage provided to the host computer without being subjected to the virtualization process. The example shown in FIG. 18 is same as that of FIG. 17 except that as the virtual volume management information 531 (Port ID, Port Name, LUN), information identical to that of the real volume identification information (real volume management information) is set, and further, as virtualization processing module management information 533, "virtualization process is not executed (None)" is set.

In FIG. 18, a target of the access path switching control to the volume identified by Port ID=P_Pid__1, LUN=3 is the port (Out Port) which is set in the storage connection module management information 534.

(3) In the case where the virtualization controller has a built-in storage

Each embodiment of the present invention as described above has been explained with a case that the storage controller 7 and the storage 3 are connected via the port 6. However, the present invention is not limited to this example. For instance, it may be possible to apply the present invention to the case where the storage controller 7 and the storage are directly connected.

Figure 19:
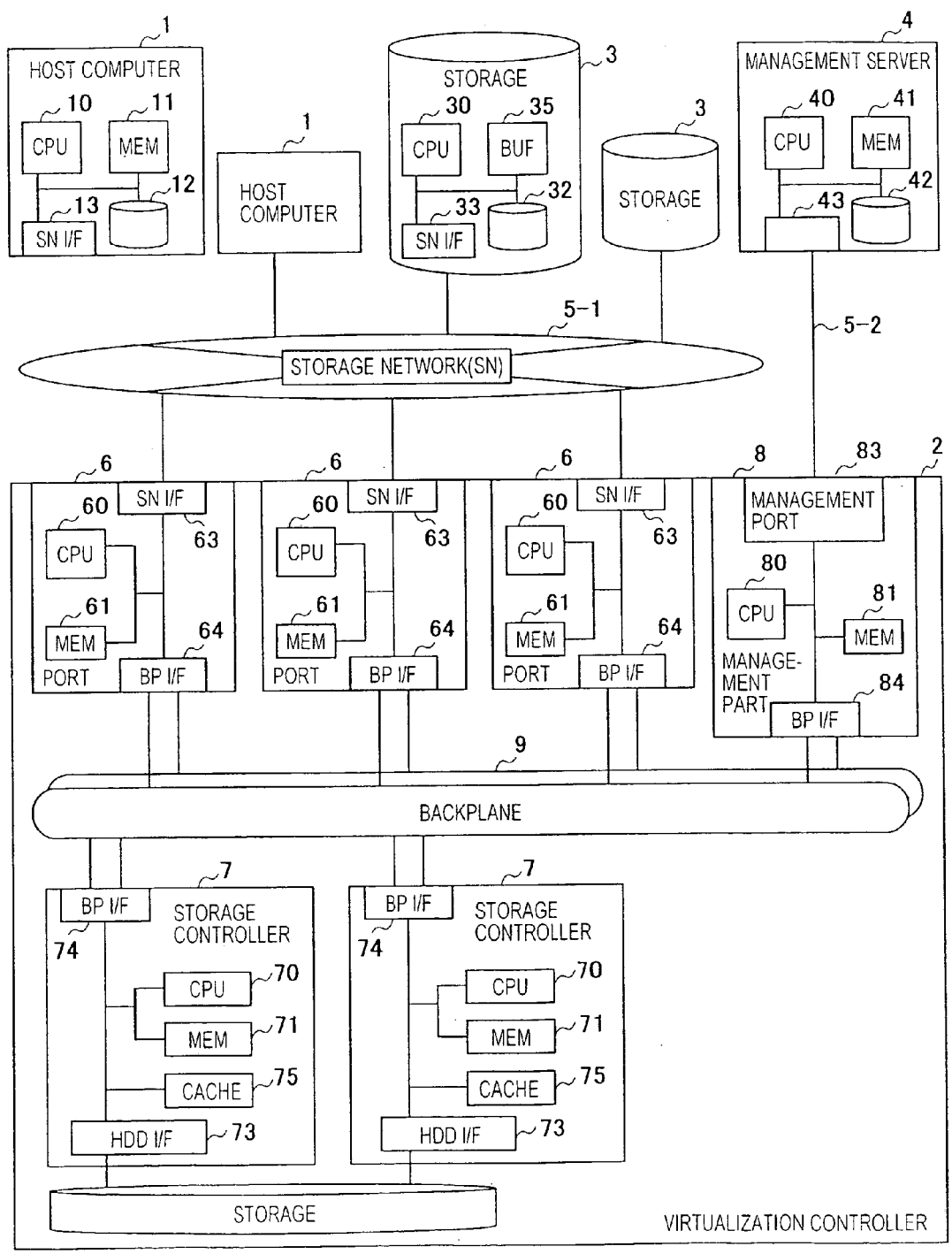
FIG. 19 is a block diagram showing a configuration example of a computer system when the virtualization controller has a built-in storage.

FIG. 19 is a block diagram showing a configuration example of a computer system when the virtualization controller has a built-in storage.

The computer system as shown in FIG. 19 is same as the one shown in FIG. 1 except that one more or a plurality of storages 3 are newly provided inside of the virtualization controller 2, and interface controller 73 (HDD I/F) is newly provided for controlling a network which connects the storage controllers 7-1, 7-2 of the virtualization controller 2 and the storage 3 inside of the virtualization controller 2, and the storage controllers 7-1 and 7-2 are connected to the same storage 3 newly provided in the virtualization controller 2.

Then, in the example as shown in FIG. 19, the storage controllers 7-1 and 7-2 are subjected to access path switching control for the access path to the storage 3 which is connected to the storage controllers 7-1, 7-2. The access path switching control can be carried out in a similar manner as that in each embodiment of the present invention as described above.

(4) Other Variations

Each embodiment of the present invention as described above has been explained assuming that access path switching process is executed at a timing when an incomplete command goes out of existence in the port 6 (In Port). However, the present invention is not limited to this example. For instance, it is also possible to carry out the access path switching process is executed, for example, upon a receipt of path switching instruction and request. However, in this case, it is desirable that a procedure sequence is controlled between the incomplete command and a newly received command (such as preventing the newly received command from being executed ahead the incomplete command), and it is also desirable that synchronization control of the command process is carried out between each of the modules constituting the virtualization controller.

Each embodiment of the present invention as described above has been explained with an example that the virtualization process is carried out in the storage controller 7 or in the port 6 (Out Port). However, the present invention is not limited to this example. For instance, it is also possible to carry out the virtualization control in port 6 (In Port).

Further in each embodiment of the present invention as described above, an example was explained that an access trend and the like from the host computer is monitored by software. However, the present invention is not limited to this example. For instance, it may also be possible to monitor the access trend and update the management table by hardware.

Each process in each of the embodiments of the present invention can be configured as a processing program, and this processing program can be provided by being stored in a storage medium such as HD, DAT, FD, MO, DVD-ROM, CD-ROM and the like.

According to each of the embodiments of the present invention as described above, an optimum access path is selected for switching out of a plurality of access paths connecting the host computer and the storage, without performing data migration process between the storages constituting the storage system. Therefore, it is possible to enhance the access performance for the storage system.

According to each of the embodiments of the present invention, it is further possible to carry out the access path switching process based on the usage status of various resources constituting the virtualization controller. Therefore, a distributed control of processing load within the virtualization controller is possible, resulting that the access performance to the storage system can be enhanced.

Further, according to each of the embodiments of the present invention, the access path switching process can be carried out based on the setup condition from the system administrator and various results (resource usage status, access trend and the like) detected by the virtualization controller itself. Therefore, it is possible to provide an access performance required for the storage system which dynamically changes, without increasing the load on the system administrator.

What is claimed is:

1. A virtualization controller which is connected to one or a plurality of storages and one or a plurality of host computers, comprising:

a plurality of ports connected to one or both of said host computer and said storage; and one or a plurality of storage controllers, wherein:

each of said ports and said storage controllers comprises:

a virtualization processor which holds corresponding information between first identification information and second identification information, the first identification information being used for said host computer to access a storage area held by said storage, and said second identification information being used for said virtualization controller to identify said storage area, converts based on said corresponding information data having the first identification information received from the host computer into data having the second identification information, transfers the data thus converted to a storage having said storage area, converts data having the second identification information received from said storage into data having the first identification information, and transfers the data thus converted to said host computer, wherein said virtualization processor comprises:

access path management information which registers a first port controlled by said host computer, a second port connected to said storage, and said virtualization processor, as an access path for each storage area of said storage, wherein when a request for changing said access path is received, said access path management information is updated, and data send/receive control is carried out between the host computer and the storage area of the storage by use of a new access path, and wherein said virtualization processor determines a type of access to a storage area being requested by an access request, manages information of the type of access being requested as access history management information and changes to said new access path based on said access history management information.

2. A virtualization controller, according to claim 1, further comprising:

a third port which is connected to a management server, wherein said access path management information is updated upon receipt of a change request as to the access path received from said management server via said third port, and the data send/receive control is carried out between said host computer and the storage area in said storage, by use of a new access path.

3. A virtualization controller, according to claim 1, further comprising:

a third port which is connected to a management server, wherein:

schedule information is held as control information regarding an access path change received from said management server via said third port, said access path management information is updated based on the schedule information, and the data send/receive control between said host computer and the storage area of said storage is carried out by use of a new access path.

4. A virtualization controller, according to claim 1, further comprising:

a third port which is connected to a management server, wherein:

a threshold of usage rate of each module constituting said virtualization controller is held, which is control information regarding an access path change from said management server, received via said third port, a usage status of each module constituting said virtualization controller is monitored, said threshold is compared with said usage status, and at a timing when said usage status goes over said threshold, said access path management information is updated, and the data send/receive control between said host computer and the storage area of said storage is carried out by use of a new access path.

5. A virtualization controller, according to claim 1, wherein:

information whether or not each of said storage area of said storage is subjected to a virtualization process is held as virtualization processing control information, and a control is made to execute said virtualization process with respect to each of said storage area included in said plurality of storages, based on said virtualization processing control information.

6. A virtualization controller according to claim 1, wherein a process of changing the access path is carried out based on usage status of each resource to which access is controlled by said virtualization controller.

7. A virtualization controller according to claim 1, wherein a process of changing the access path is carried out based on a policy set by a manager.

8. A virtualization controller which is connected to one or a plurality of storages and one or a plurality of host computers, comprising:

a plurality of ports connected to one or both of said host computer and said storage; and one or a plurality of storage controllers, wherein each of said ports and said storage controllers comprises:

a virtualization processor which holds corresponding information between first identification information and second identification information, said first identification information being used for said host computer to access a storage area held by said storage, and said second identification information being used for said virtualization controller to identify said storage area, converts based on said corresponding information data having the first identification information received from the host computer into data having the second identification information, transfers the data thus converted to a storage having said storage area, converts data having the second identification information received from said storage into data having the first identification information, and transfers the data thus converted to said host computer, said virtualization processor comprises:

access path management information which registers a first port controlled by said host computer, a second port connected to said storage, and said virtualization processor, as an access path for each storage area of said storage, and wherein when a request for changing said access path is received, said access path management information is updated, and data send/receive control is carried out between the host computer and the storage area of the storage by use of a new access path, said virtualization controller further comprising:

a third port which is connected to a management server, wherein:

management information by access type is held as control information regarding an access path change received from said management server via said third port, a type of individual access request of a storage area of said storage is determined, said type of access request is held and managed as access history management information by storage area, said access path management information is updated based on said management information by said access type and said access history management information, and the data send/receive control is carried out between said host computer and the storage area of said storage by use of a new access path.

9. A virtualization controller according to claim 8, wherein a process of changing the access path is carried out based on usage status of each resource to which access is controlled by said virtualization controller.

10. A virtualization controller according to claim 8, wherein a process of changing the access path is carried out based on a policy set by a manager.

11. A computer system comprising:

one or a plurality of storages;

one or a plurality of host computers; and a virtualization controller, said one or a plurality of storages, said one or a plurality of host computers, and said virtualization controller are connected to each other,
wherein;
said virtualization controller comprises:
a plurality of ports connected to one or both of said host computer and said storage, and
one or a plurality of storage controllers,
wherein:
each of said ports and said storage controllers comprises:
a virtualization processor which holds corresponding information between first identification information and second identification information, said first identification information being used for said host computer to access a storage area held by said storage, and said second identification information being used for said virtualization controller to identify said storage area, converts based on said corresponding information data having said first identification information received from the host computer into data having said second identification information, transfers the data thus converted to a storage having said storage area, converts data having the second identification information received from said storage into data having the first identification information, and transfers the data thus converted to the host computer,
wherein said virtualization controller comprises:
access path management information which registers a first port connected to said host computer, a second port connected to said storage, and said virtualization processor, as an access path for each storage area of said storage,
wherein when a request for changing said access path is received, said access path management information is updated, and data send/receive control is carried out between the host computer and the storage area of the storage by use of a new access path, and
wherein said virtualization processor determines a type of access to a storage area being requested by an access request, manages information of the type of access being requested as access history management information and changes to said new access path based on said access history management information.

12. A computer system according to claim 11, wherein a process of switching the access path is carried out based on usage status of each resource to which access is controlled by said virtualization controller.

13. A computer system according to claim 11, wherein a process of switching the access path is carried out based on a policy set by a manager.

* * * * *